United States Patent
Mehta et al.

(10) Patent No.: US 6,928,076 B2
(45) Date of Patent: Aug. 9, 2005

(54) SYSTEM AND METHOD FOR CONTROLLING SIGNAL PROCESSING IN A VOICE OVER PACKET (VOP) ENVIRONMENT

(75) Inventors: Manoj Mehta, Laguna Hills, CA (US); Saurin Shah, Santa Clara, CA (US); Dianne Steiger, Irvine, CA (US); Chris Lawton, Costa Mesa, CA (US); Anurag Bist, Newport Coast, CA (US)

(73) Assignee: Intel Corporation, Santa Clara, CA (US)

( * ) Notice: Subject to any disclaimer, the term of this patent is extended or adjusted under 35 U.S.C. 154(b) by 463 days.

(21) Appl. No.: 09/960,886

(22) Filed: Sep. 21, 2001

(65) Prior Publication Data

US 2002/0054588 A1 May 9, 2002

Related U.S. Application Data

(60) Provisional application No. 60/234,847, filed on Sep. 22, 2000, and provisional application No. 60/234,743, filed on Sep. 22, 2000.

(51) Int. Cl.$^7$ .............................. H04L 12/66; H04J 3/24
(52) U.S. Cl. ..................... 370/392; 370/352; 370/395.1; 370/474

(58) Field of Search ................................. 370/352, 389, 370/392, 395.1, 474, 412, 428, 465, 349, 351, 919, 420, 471, 373, 384, 254

(56) References Cited

U.S. PATENT DOCUMENTS 5,774,698 A * 6/1998 Olnowich ...................... 712/1

FOREIGN PATENT DOCUMENTS

| EP | 0 829 995 A2 | * | 3/1998 | ............ H04M/3/00 |
| WO | WO 99 16271 | * | 4/1999 | ............ H04Q/7/24 |
| WO | WO 00 21259 | * | 4/2000 | ............ H04L/12/66 |

* cited by examiner

Primary Examiner—Afsar Qureshi
(74) Attorney, Agent, or Firm—Alan Pedersen-Giles

(57) ABSTRACT

One aspect of the invention relates to a messaging communication scheme for controlling, configuring, monitoring and communicating with a signal processor within a Voice Over Packet (VoP) subsystem without knowledge of the specific architecture of the signal processor. The messaging communication scheme may feature the transmission of control messages between a signal processor and a host processor. Each control message comprises a message header portion and a control header portion. The control header portion includes at least a catalog parameter that indicates a selected grouping of control messages and a code parameter that indicates a selected operation of the selected grouping.

27 Claims, 44 Drawing Sheets

| | | | |
|---|---|---|---|
| 500 — HPRQSTAT_X | Read | 1-bit | Determine flow control status |
| 505 — HPRQDATA_X | Write | 32-bit | Host writes (burst) data to given RX queue |
| 510 — HPRQDONE_X | Write | 1-bit | Host writes to indicate end of frame |

| 515 | 520 | |
|---|---|---|
| HRCRQS bit = 0 | HPCRFS bit = 0 | Empty |
| HPCRQS bit = 0 | HPCRFS bit = 0 | Not Empty |
| HPCRFS bit = 1 | HPCRFS bit = 1 | Full |
| HPCRFS bit = 1 | HPCRFS bit = 1 | Disabled |

*Figure 6*

| | | | |
|---|---|---|---|
| HPXQSTAT_X | Read | 10-bits | — 525 |
| HPXQDATA_X | Read | 32-bits | — 530 |
| HPXQCNT_X | Read | 16-bits | — 535 |

| 820 | | | | 800 |
|---|---|---|---|---|
| b31...24 | b23...16 | b15...8 | b7...0 | |
| Octet 3 | Octet 2 | Octet 1 | Octet 0 | |
| Octet 7 | Octet 6 | Octet 5 | Octet 4 | 810 |

*Figure 10*

| Title | Bit 7 | 6 | 5 | 4 | 3 | 2 | 1 | Bit 0 | Octet |
|---|---|---|---|---|---|---|---|---|---|
| Control Header | Dest Node *910* | | | | | | | | 0 |
| | Source Node *920* | | | | | | | | 1 |
| | Msg Length (7...0) *940* | | | | | | | | 2 |
| | Priority *930* | | - | Msg Type *950* | | | Msg Length (10..8) *940* | | 3 |
| | Tag or Sequence# *960* | | | | | | | | 4 |
| | Control Length *970* | | | | | | | | 5 |
| | Catalog *980* | | | | | | | | 6 |
| | Code *990* | | | | | | | | 7 |

| Catalog Name | Value | Description | |
|---|---|---|---|
| Device Control | 0x00 | Device Init, Config control | 1010 |
| Session Control | 0x01 | Session Setup, Teardown | 1020 |
| Telephony Services | 0x02 | Tone, DTMF Gen/Det, Echo Cancellation | 1030 |
| Voice Services | 0x03 | Voice Coder/Decoder | 1040 |
| Fax Services | 0x04 | Fax V.17, V.21, V.27, V.29, T.30, T.38 | 1050 |
| Modem Services | 0x05 | Data V.32, V32bis, V.34, V.90 | 1060 |

| Mnemonic | Code | Description |
|---|---|---|
| DEV_INFO | 0x00 | Get Signal Processor Info |
| DEV_INFO_RSP | 0x01 | |
| DEV_POOL_INIT | 0x02 | Configure memory pools |
| DEV_POOL_INIT_RSP | 0x03 | |
| DEV_REPORT_CONFIG | 0x04 | Configure Signal Processor |
| DEV_REPORT_CONFIG_RSP | 0x05 | |
| SERIAL_PORT_SETUP | 0x06 | Configures TDM Serial ports |
| SERIAL_PORT_SETUP_RSP | 0x07 | |
| SEG_ALLOC | 0x08 | Reserve space to store a Segment |
| SEG_ALLOC_RSP | 0x09 | |
| SEG_ACTIVATE | 0x0A | Activate a downloaded Segment |
| SEG_ACTIVATE_RSP | 0x0B | |
| DEV_SET_NODE | 0x0C | Configures Signal Processor ID |
| DEV_SET_NODE_RSP | 0x0D | |
| | | |
| PING | 0xEE | Test message |
| ECHO | 0xEF | Test message |
| DEV_HEARTBEAT | 0xF0 | Device runtime Status |
| DEV_STATS | 0xF1 | Device runtime Statistics |

1010 { (braces grouping above rows)

*Figure 13*

| Title | Bit 7 | 6 | 5 | 4 | 3 | 2 | 1 | Bit 0 | Octet |
|---|---|---|---|---|---|---|---|---|---|
| Node IDs | Signal Processor Node ID (default = 1) *1101* | | | | | | | | 8 |
| | Host Node ID (default = 1) *1102* | | | | | | | | 9 |
| | Reserved | | | | | | | | 10 |
| | Reserved | | | | | | | | 11 |

1100

*Figure 14*

| Title | Bit 7 | 6 | 5 | 4 | 3 | 2 | 1 | Bit 0 | Octet |
|---|---|---|---|---|---|---|---|---|---|
| Status 1106 | Status LS byte ||||||||  8 |
| | ... |||||||| 9 |
| | ... |||||||| 10 |
| | Status MS byte |||||||| 11 |

| Title | Bit 7 | 6 | 5 | 4 | 3 | 2 | 1 | Bit 0 | Octet |
|---|---|---|---|---|---|---|---|---|---|
| Processor Info | Signal Processor Version  1111 |||||||| 8 |
| | Internal Memory Size  1113 |||||||| 9 |
| | Firmware Version  1112 |||||||| 10 |
| | Reserved |||||||| 11 |

| Title | 7 | 6 | 5 | 4 | 3 | 2 | 1 | 0 | Octet |
|---|---|---|---|---|---|---|---|---|---|
| Serial Buffer Cfg. | Serial Buffer Size Lo |||||||| 8 |
| | Serial Buffer Size Hi |||||||| 9 |
| | Num of TDM Buffers Lo |||||||| 10 |
| | Num of TDM Buffers Hi |||||||| 11 |
| Host Port Buffer Cfg. | Host Port Buffer Size Lo |||||||| 12 |
| | Host Port Buffer Size Hi |||||||| 13 |
| | Num of Host Port Buffers Lo |||||||| 14 |
| | Num of Host Port Buffers Hi |||||||| 15 |
| Dynamic Mem Buffer Cfg. | Dynamic Mem Buffer Size Lo |||||||| 16 |
| | Dynamic Mem Buffer Size Hi |||||||| 17 |
| | Num of Dynamic Mem Buffers Lo |||||||| 18 |
| | Num of Dynamic Mem Buffers Hi |||||||| 19 |

1115

1116 (octets 8-11), 1117 (octets 12-15), 1118 (octets 16-19)

*Figure 17*

| Title | Bit 7 | 6 | 5 | 4 | 3 | 2 | 1 | Bit 0 | Octet |
|---|---|---|---|---|---|---|---|---|---|
| Status *1121* | Status LS byte ||||||||8|
| | ... ||||||||9|
| | ... ||||||||10|
| | Status MS byte ||||||||11|

| Title | Bit 7 | 6 | 5 | 4 | 3 | 2 | 1 | 0 | Octet |
|---|---|---|---|---|---|---|---|---|---|
| Device Cfg. | DEV_HEARTBEAT Frequency Lo ||||||||8|
| | DEV_HEARTBEAT Frequency Hi ||||||||9|
| | DEV_STATISTIC Frequency Lo ||||||||10|
| | DEV_STATISTIC Frequency Hi ||||||||11|
| | Device Debug Config/Level Lo ||||||||12|
| | Device Debug Config/Level Hi ||||||||13|
| | Reserved ||||||||14|
| | Reserved ||||||||15|

1125

1126 (octets 8-9), 1127 (octets 10-11)

*Figure 19*

| Title | Bit 7 | 6 | 5 | 4 | 3 | 2 | 1 | Bit 0 | Octet |
|---|---|---|---|---|---|---|---|---|---|
| Status *1131* | Status LS byte ||||||||8|
| | ... ||||||||9|
| | ... ||||||||10|
| | Status MS byte ||||||||11|

| Title | Bit 7 | 6 | 5 | 4 | 3 | 2 | 1 | Bit 0 | Octet |
|---|---|---|---|---|---|---|---|---|---|
| HB Seq Num | Heartbeat # Lo ||||||||8|
| | Heartbeat # Hi ||||||||9|
| | Reserved ||||||||10|
| | Reserved ||||||||11|

| | | | |
|---|---|---|---|
| Session Stats | Total Sessions Serviced LSB | 8 | |
| | ... | 9 | |
| | ... | 10 | 1141 |
| | Total Sessions Serviced MSB | 11 | |
| | Current Active Sessions LSB | 12 | |
| | ... | 13 | |
| | ... | 14 | 1142 |
| | Current Active Sessions MSB | 15 | |
| | Current Session Load LSB | 16 | |
| | ... | 17 | |
| | ... | 18 | 1143 |
| | Current Session Load MSB | 19 | |
| | Setup Failures LSB | 20 | |
| | ... | 21 | |
| | ... | 22 | 1144 |
| | Setup Failures MSB | 23 | |
| | Start Failures LSB | 24 | |
| | ... | 25 | |
| | ... | 26 | 1145 |
| | Start Failures MSB | 27 | |
| Device Stats | TDM Overflows LSB | 28 | |
| | ... | 29 | |
| | ... | 30 | 1146 |
| | TDM Overflows MSB | 31 | |
| | TDM Underflows LSB | 32 | |
| | ... | 33 | |
| | ... | 34 | 1147 |
| | TDM Underflows MSB | 35 | |
| | Bad Port Event LSB | 36 | |
| | ... | 37 | |
| | ... | 38 | 1148 |
| | Bad Port Event MSB | 39 | |
| | Num Jobs Queued LSB | 40 | |
| | ... | 41 | |
| | ... | 42 | 1149 |
| | Num Jobs Queued MSB | 43 | |
| | Total Jobs - Podi 0 LSB | 44 | |
| | ... | 45 | |
| | ... | 46 | |
| | Total Jobs - Podi 0 MSB | 47 | |
| | Total Jobs - Podi 1 LSB | 48 | 1150 |
| | ... | 49 | |
| | ... | 50 | |
| | Total Jobs - Podi 1 MSB | 51 | |
| | Total Jobs - Podi 2 LSB | 52 | |
| | ... | 53 | |
| | ... | 54 | |
| | Total Jobs - Podi 2 MSB | 55 | |
| | Total Jobs - Podi 3 LSB | 56 | |
| | ... | 57 | |
| | ... | 58 | |
| | Total Jobs - Podi 3 MSB | 59 | |

*Figure 22*

| | | Bit 7 | 6 | 5 | 4 | 3 | 2 | 1 | Bit 0 | Octet |
|---|---|---|---|---|---|---|---|---|---|---|
| 1156 | Port | - | | | | | SPNUM | | | 8 |
| | | 1167 | 1166 | - | | | | | | 9 |
| 1157 | Rx Control | DCS | FSP | FSS | 1165 | 1170 | - | | 1168 | 10 |
| | | CKD | FSD | DER | DES | DBD | 1169 | | DCP | 11 |
| 1158 | Rx Chan Control | 1173 | 1172 | 1171 | MAX_RCC | | | 1176 | | 12 |
| | | | | | RCS | | | 1175 | | 13 |
| 1159 | Rx Clk Control | - | | 1183 | EN | SNC | SP | | SM | 14 |
| | | | | DIV | 1180 | | 1184 | 1182 | 1181 | 15 |
| 1160 | Rx FS Control | 1187 | 1186 | FPER (7..0) | | | | 1185 | | 16 |
| 1161 | | EN | GO | FPER (13..8) | | | | | | 17 |
| 1162 | Tx Control | DCS | FSP | FSS | | | - | | | 18 |
| | | CKD | FSD | DER | DES | DBD | | | DCP | 19 |
| 1163 | Tx Chan Control | MAX_TCC | | | | | | | | 20 |
| | | TCS | | | | | | | | 21 |
| 1164 | Tx Clk Control | - | | | EN | SNC | SP | | SM | 22 |
| | | DIV | | | | | | | | 23 |
| | Tx FS Control | FPER (7..0) | | | | | | | | 24 |
| | | EN | GO | FPER (13..8) | | | | | | 25 |
| | - | Reserved | | | | | | | | 26 |
| | - | Reserved | | | | | | | | 27 |

| Title | Bit 7 | 6 | 5 | 4 | 3 | 2 | 1 | Bit 0 | Octet |
|---|---|---|---|---|---|---|---|---|---|
| Status Field | Status LS byte | | | | | | | | 8 |
| | ... | | | | | | | | 9 |
| | ... | | | | | | | | 10 |
| | Status MS byte | | | | | | | | 11 |
| Port 1201 | - | | | 1206 | | SPNUM | | | 12 |
| | - | | | | | 1205 | | EN | 13 |
| | Reserved | | | | | | | | 14 |
| | Reserved | | | | | | | | 15 |

| Title | Bit 7 | 6 | 5 | 4 | 3 | 2 | 1 | 0 | Octet |
|---|---|---|---|---|---|---|---|---|---|
| | Reserved ||||||||| 8 |
| | Reserved ||||||||| 9 |
| Segment Size | Memory Space Size Lo ||||||||| 10 |
| | Memory Space Size Hi ||||||||| 11 |

*Figure 25*

| Title | Bit 7 | 6 | 5 | 4 | 3 | 2 | 1 | Bit 0 | Octet |
|---|---|---|---|---|---|---|---|---|---|
| Status | Status LS byte ||||||||| 8 |
| | ... ||||||||| 9 |
| | ... ||||||||| 10 |
| | Status MS byte ||||||||| 11 |
| Segment Start Addr | Start Address LS byte ||||||||| 12 |
| | ... ||||||||| 13 |
| | ... ||||||||| 14 |
| | Start Address MS byte ||||||||| 15 |

*Figure 26*

| Title | Bit 7 | 6 | 5 | 4 | 3 | 2 | 1 | Bit 0 | Octet |
|---|---|---|---|---|---|---|---|---|---|
| Status 1221 | Status LS byte ||||||||| 8 |
| | ... ||||||||| 9 |
| | ... ||||||||| 10 |
| | Status MS byte ||||||||| 11 |

*Figure 27*

| Mnemonic | MsgCode | Description |
|---|---|---|
| SESSION_SETUP | 0x00 | Sets up a Voice Session |
| SESSION_SETUP_RSP | 0x01 | |
| SESSION_START | 0x02 | Activates a Session |
| SESSION_START_RSP | 0x03 | |
| SESSION_STOP | 0x04 | De-activates a Session |
| SESSION_STOP_RSP | 0x05 | |
| SESSION_TEARDOWN | 0x06 | Tears down a Voice Session |
| SESSION_TEARDOWN_RSP | 0x07 | |
| SESSION_QUERY | 0x08 | Session Query |
| SESSION_QUERY_RSP | 0x09 | |
| SESSION_TEST | 0x0A | Put Session in a Test Mode |
| SESSION_TEST_RSP | 0x0B | |
| SESSION_STATS_REQUEST | 0x0C | Request Session Statistics Report |
| SESSION_STATS_REQUEST_RSP | 0x0D | Session Statistics Report |

*Figure 28*

| Title | Bit 7 | 6 | 5 | 4 | 3 | 2 | 1 | Bit 0 | Octet |
|---|---|---|---|---|---|---|---|---|---|
| Session ID | \multicolumn{8}{c|}{SessionID Lo} | 8 |
| | \multicolumn{8}{c|}{SessionID Hi} | 9 |
| Service Setup | \multicolumn{8}{c|}{Coder Service *1315*} | 10 |
| | *1320* *1329* \multicolumn{7}{c|}{Decoder Service *1316*} | 11 |
| Telephony | TDMType | \multicolumn{3}{c|}{Test Mode *1322*} | *1326* | \multicolumn{3}{c|}{ECS *13.'1*} | 12 |
| | - | Mute | VAD | IBOB | TG | DTG | TD | DTD | 13 |
| Near End Channels | *1327* *1328* \multicolumn{7}{c|}{Near Rx Addr (7...0)*1325* *1324* *1323*} | 14 |
| | - | | | | \multicolumn{4}{c|}{Near Rx Addr (11..8) *1330*} | 15 |
| | \multicolumn{8}{c|}{Near Tx Addr (7..0)} | 16 |
| | - | | | | \multicolumn{4}{c|}{Near Tx Addr (11..8) *1331*} | 17 |
| Far End Channels | \multicolumn{8}{c|}{Far Rx Addr (7..0)} | 18 |
| | - | | | | \multicolumn{4}{c|}{Far Rx Addr (11..8) *1332*} | 19 |
| | \multicolumn{8}{c|}{Far Tx Addr (7..0)} | 20 |
| | - | | | | \multicolumn{4}{c|}{Far Tx Addr (11..8) *1333*} | 21 |
| Near End Tag | \multicolumn{8}{c|}{Near End Tag Lo} | 22 |
| | \multicolumn{8}{c|}{Near End Tag Hi} | 23 |
| Far End Tag | \multicolumn{8}{c|}{Far End Tag Lo} | 24 |
| | \multicolumn{8}{c|}{Far End Tag Hi} | 25 |
| | \multicolumn{8}{c|}{Reserved} | 26 |
| | \multicolumn{8}{c|}{Reserved} | 27 |

*Figure 29*

| Coder/Decoder Service (8-bit) | Coder Output / Decoder Input |
|---|---|
| 0x00 | No Coder/Decoder |
| 0x01 | G 711 Mu-law, 40 bytes |
| 0x02 | G 711 Mu-law, 80 bytes |
| 0x03 | G 711 Mu-law, 240 bytes |
| 0x04 | G.711 Mu-law, 160 bytes |
| ... | |
| 0x08 | G 711 A-law, 40 bytes |
| 0x09 | G 711 A-law, 80 bytes |
| 0x0A | G 711 A-law, 240 bytes |
| 0x0B | G 711 A-law, 160 bytes |
| ... | |
| 0x10 | PCM Linear (16-bit), 40 samples |
| 0x11 | PCM Linear (16-bit), 80 samples |
| 0x12 | PCM Linear (16-bit), 240 samples |
| 0x13 | PCM Linear (16-bit), 160 samples |
| ... | |
| 0x18 | G 723.1 (5.3 kbps) |
| 0x19 | G 723.1 (6.3 kbps) |
| 0x20 | G 729 A/B (8 Kbps) |
| ... | |
| 0x30 | G 726-16, 40 samples |
| 0x31 | G 726-16, 80 samples |
| 0x32 | G 726-16, 240 samples |
| 0x33 | G 726-16, 160 samples |
| 0x34 | G 726-24, 40 samples |
| 0x35 | G 726-24, 80 samples |
| 0x36 | G 726-24, 240 samples |
| 0x37 | G 726-24, 160 samples |
| 0x38 | G 726-32, 40 samples |
| 0x39 | G 726-32, 80 samples |
| 0x3A | G 726-32, 240 samples |
| 0x3B | G 726-32, 160 samples |
| 0x3C | G 726-40, 40 samples |
| 0x3D | G 726-40, 80 samples |
| 0x3E | G 726-40, 240 samples |
| 0x3F | G 726-40, 160 samples |
| ... | |
| 0x40 | GSM |
| ... | ... |
| 0x80 | FAX demod/remod (V.27/V.29/V.17) |
| ... | |
| 0x90 | V.32 Modem |
| 0x91 | V.34 Modem |
| 0x92 | V.90 Modem |
| ... | |
| 0xA0 | Transcoder: GSM to G 729A |
| 0xA1 | Transcoder: G 729A to GSM |
| ... | ... |
| 0xF0 | Loop back (Near-in to Near-out/Far-in to Far-out), 40 samples |
| 0xF1 | Loop back (Near-in to Near-out/Far-in to Far-out), 80 samples |
| 0xF2 | Loop back (Near-in to Near-out/Far-in to Far-out), 240 samples |
| 0xF3 | Loop back (Near-in to Near-out/Far-in to Far-out), 160 samples |
| 0xF4 | Pass Through (Near-in to Far-out/ Far-in to Near-out), 40 samples |
| 0xF5 | Pass Through (Near-in to Far-out/ Far-in to Near-out), 80 samples |
| 0xF6 | Pass Through (Near-in to Far-out/ Far-in to Near-out), 240 samples |
| 0xF7 | Pass Through (Near-in to Far-out/ Far-in to Near-out), 160 samples |

*Figure 30*

| Value (3-bit) | Echo Cancellation Setup |
|---|---|
| 0 | No Echo Cancellation |
| 1 | 8ms EC tail length |
| 2 | 16 ms EC tail length |
| 3 | 32 ms EC tail length |
| 4 | 64 ms EC tail length |
| 5 | 128 ms EC tail length |
| 6 | 96 ms EC tail length |
| 7 | Reserved |

*Figure 31*

| Value (3-bit) | Test Mode |
|---|---|
| 0 | Normal Operation |
| 1 | Coder Loopback |
| 2 | Decoder Loopback |
| 3-7 | Reserved |

*Figure 32*

| Address (12-bit) | Description |
|---|---|
| 0x000..0x1FF | Serial Port Channel (TDM Slot) |
| 0x200..0x3FF | Future |
| 0x400..0x5FF | Host Port Channel (Queue #) |
| 0x600..0x7FF | Future |
| 0x800..0xFEF | Reserved |
| 0xFF0 | Flow not valid |
| 0xFF1 | Any Serial Port Channel |
| 0xFF2 | Any Host Port Channel |
| 0xFF3..0xFFF | Reserved |

*Figure 33*

| Title | Bit 7 | 6 | 5 | 4 | 3 | 2 | 1 | Bit 0 | Octet |
|---|---|---|---|---|---|---|---|---|---|
| Status *1336* | \multicolumn{8}{c|}{Status LS byte} | 8 |
| | \multicolumn{8}{c|}{...} | 9 |
| | \multicolumn{8}{c|}{...} | 10 |
| | \multicolumn{8}{c|}{Status MS byte} | 11 |
| Session ID *1337* | \multicolumn{8}{c|}{SessionID Lo} | 12 |
| | \multicolumn{8}{c|}{SessionID Hi} | 13 |
| Near End Channels *1338* | \multicolumn{8}{c|}{Near Recv Addr (7..0)} | 14 |
| | - | | | | \multicolumn{4}{c|}{Near Recv Addr (11..8) *1341*} | 15 |
| | \multicolumn{8}{c|}{Near Xmit Addr (7..0)} | 16 |
| | - | | | | \multicolumn{4}{c|}{Near Xmt Addr (11..8) *1342*} | 17 |
| Far End Channels *1339* | \multicolumn{8}{c|}{Far Recv Addr (7..0)} | 18 |
| | - | | | | \multicolumn{4}{c|}{Far Recv Addr (11..8) *1343*} | 19 |
| | \multicolumn{8}{c|}{Far Xmit Addr (7..0)} | 20 |
| | - | | | | \multicolumn{4}{c|}{Far Xmt Addr (11..8) *1344*} | 21 |
| Session Load *1340* | \multicolumn{8}{c|}{Current Session Load LS Byte} | 22 |
| | \multicolumn{8}{c|}{...} | 23 |
| | \multicolumn{8}{c|}{...} | 24 |
| | \multicolumn{8}{c|}{Current Session Load MS Byte} | 25 |
| | \multicolumn{8}{c|}{Reserved} | 26 |
| | \multicolumn{8}{c|}{Reserved} | 27 |

| Title | Bit 7 | 6 | 5 | 4 | 3 | 2 | 1 | Bit 0 | Octet |
|---|---|---|---|---|---|---|---|---|---|
| Session ID | \multicolumn{8}{c|}{SessionID Lo} | 8 |
| | \multicolumn{8}{c|}{SessionID Hi} | 9 |
| | \multicolumn{8}{c|}{Reserved} | 10 |
| | \multicolumn{8}{c|}{Reserved} | 11 |

| Title | Bit 7 | 6 | 5 | 4 | 3 | 2 | 1 | 0 | Octet |
|---|---|---|---|---|---|---|---|---|---|
| Status *1351* | Status LS byte ||||||||| 8 |
| | ... ||||||||| 9 |
| | ... ||||||||| 10 |
| | Status MS byte ||||||||| 11 |
| Session ID | Session ID Lo ||||||||| 12 |
| | Session ID Hi ||||||||| 13 |
| | Reserved ||||||||| 14 |
| | Reserved ||||||||| 15 |

| Title | Bit 7 | 6 | 5 | 4 | 3 | 2 | 1 | Bit 0 | Octet |
|---|---|---|---|---|---|---|---|---|---|
| Session ID | SessionID Lo ||||||||| 8 |
| | SessionID Hi ||||||||| 9 |
| | Reserved ||||||||| 10 |
| | Reserved ||||||||| 11 |

| Title | Bit 7 | 6 | 5 | 4 | 3 | 2 | 1 | 0 | Octet |
|---|---|---|---|---|---|---|---|---|---|
| Status *1361* | Status LS byte ||||||||| 8 |
| | ... ||||||||| 9 |
| | ... ||||||||| 10 |
| | Status MS byte ||||||||| 11 |
| Session ID | Session ID Lo ||||||||| 12 |
| | Session ID Hi ||||||||| 13 |
| | Reserved ||||||||| 12 |
| | Reserved ||||||||| 13 |

| Title | Bit 7 | 6 | 5 | 4 | 3 | 2 | 1 | Bit 0 | Octet |
|---|---|---|---|---|---|---|---|---|---|
| Session ID *1366* | \multicolumn{8}{c|}{SessionID Lo} | 8 |
| | \multicolumn{8}{c|}{SessionID Hi} | 9 |
| | \multicolumn{8}{c|}{Reserved} | 10 |
| | \multicolumn{8}{c|}{Reserved} | 11 |

| Title | Bit 7 | 6 | 5 | 4 | 3 | 2 | 1 | 0 | Octet |
|---|---|---|---|---|---|---|---|---|---|
| Status *1371* | \multicolumn{8}{c|}{Status LS byte} | 8 |
| | \multicolumn{8}{c|}{...} | 9 |
| | \multicolumn{8}{c|}{...} | 10 |
| | \multicolumn{8}{c|}{Status MS byte} | 11 |
| Session ID *1372* | \multicolumn{8}{c|}{Session ID Lo} | 12 |
| | \multicolumn{8}{c|}{Session ID Hi} | 13 |
| | \multicolumn{8}{c|}{Reserved} | 12 |
| | \multicolumn{8}{c|}{Reserved} | 13 |

| Title | Bit 7 | 6 | 5 | 4 | 3 | 2 | 1 | Bit 0 | Octet |
|---|---|---|---|---|---|---|---|---|---|
| Session ID *1376* | \multicolumn{8}{c|}{SessionID Lo} | 8 |
| | \multicolumn{8}{c|}{SessionID Hi} | 9 |
| | \multicolumn{8}{c|}{Reserved} | 10 |
| | \multicolumn{8}{c|}{Reserved} | 11 |

| Title | Bit 7 | 6 | 5 | 4 | 3 | 2 | 1 | Bit 0 | Octet |
|---|---|---|---|---|---|---|---|---|---|
| Status 1381 | Status LS byte ||||||||  8 |
| | ... ||||||||| 9 |
| | ... ||||||||| 10 |
| | Status MS byte ||||||||| 11 |
| Session ID | SessionID Lo ||||||||| 12 |
| | SessionID Hi ||||||||| 13 |
| Service | Coder Service ||||||||| 14 |
| | Decoder Service ||||||||| 15 |
| Telephony | TDMType ||| Test Mode ||| ECS || 16 |
| | - | Mute | VAD | IBOB | TG | DTG | TD | DTD | 17 |
| Near End Channels | Near Recv Addr (7..0) ||||||||| 18 |
| | - |||| Near Recv Addr (11..8) |||| 19 |
| | Near Xmit Addr (7..0) ||||||||| 20 |
| | - |||| Near Xmt Addr (11..8) |||| 21 |
| Far End Channels | Far Recv Addr (7..0) ||||||||| 22 |
| | - |||| Far Recv Addr (11..8) |||| 23 |
| | Far Xmit Addr (7..0) ||||||||| 24 |
| | - |||| Far Xmt Addr (11..8) |||| 25 |
| Near End Tag | Near End Tag Lo ||||||||| 26 |
| | Near End Tag Hi ||||||||| 27 |
| Far End Tag | Far End Tag Lo ||||||||| 28 |
| | Far End Tag Hi ||||||||| 29 |
| State | Session State Lo ||||||||| 30 |
| | Session State Hi ||||||||| 31 |

| Title | Bit 7 | 6 | 5 | 4 | 3 | 2 | 1 | Bit 0 | Octet |
|---|---|---|---|---|---|---|---|---|---|
| Session ID *1386* | SessionID Lo ||||||||  8 |
|  | SessionID Hi |||||||| 9 |
|  | Reserved |||||||| 10 |
|  | Reserved |||||||| 11 |

*1385* 

*Figure 43A*

| Title | Bit 7 | 6 | 5 | 4 | 3 | 2 | 1 | Bit 0 | Octet | |
|---|---|---|---|---|---|---|---|---|---|---|
| Status *1392* | Status LS byte |||||||| 8 | |
|  | .... |||||||| 9 | |
|  | .... |||||||| 10 | |
|  | Status MS byte |||||||| 11 | |
| Session ID *1391* | SessionID Lo |||||||| 12 | |
|  | SessionID Hi |||||||| 13 | |
| - | Reserved |||||||| 14 | |
|  | Reserved |||||||| 15 | |
| Frame Count | Frame Count Lo |||||||| 16 | *1394* |
|  | Frame Count Hi |||||||| 17 | |
| Bad Frames | Bad Frame Count Lo |||||||| 18 | *1395* |
|  | Bad Frame Count Hi |||||||| 19 | |
| Near End Errors | Rx Overflow  *1396* |||||||| 20 | |
|  | Tx Underflow  *1397* |||||||| 21 | |
| Far End Errors | Rx Overflow  *1398* |||||||| 22 | |
|  | Tx Underflow  *1399* |||||||| 23 | |

*1393* (braces for rows 16–23)
*1390* 

*Figure 43B*

| Mnemonic | Msg Code | Description |
|---|---|---|
| SET_EC_PARMS | 0x00 | Set Echo Cancel Parameters |
| SET_EC_PARMS_RSP | 0x01 | |
| SET_DTMF_PARMS | 0x02 | Set DTMF Parameters |
| SET_DTMF_PARMS_RSP | 0x03 | |
| SET_TONE_FREQ | 0x04 | Set TONE Frequency parameters |
| SET_TONE_FREQ_RSP | 0x05 | |
| SET_TONE_CADENCE_ON | 0x06 | Set TONE Cadence On Times |
| SET_TONE_CADENCE_ON_RSP | 0x07 | |
| SET_TONE_CADENCE_OFF | 0x08 | Set TONE Cadence Off Times |
| SET_TONE_CADENCE_OFF_RSP | 0x09 | |
| SET_TONE_THRESH_HI | 0x0A | Set TONE Thresholds Hi |
| SET_TONE_THRESH_HI_RSP | 0x0B | |
| SET_TONE_THRESH_LO | 0x0C | Set TONE Thresholds Lo |
| SET_TONE_THRESH_LO_RSP | 0x0D | |
| | | |
| REQ_EC_PARMS | 0x10 | Request EC parameters |
| REQ_EC_PARMS_RSP | 0x11 | |
| REQ_DTMF_PARMS | 0x12 | Request DTMF parameters |
| REQ_DTMF_PARMS_RSP | 0x13 | |
| REQ_TONE_FREQ | 0x14 | Request TONE Frequency parameters |
| REQ_TONE_FREQ_RSP | 0x15 | |
| REQ_TONE_CADENCE_ON | 0x16 | Request TONE Cadence – on times |
| REQ_TONE_CADENCE_ON_RSP | 0x17 | |
| REQ_TONE_CADENCE_OFF | 0x18 | Request TONE Cadence – off times |
| REQ_TONE_CADENCE_OFF_RSP | 0x19 | |
| REQ_TONE_THRESH_HI | 0x1A | Request TONE Thresholds - high |
| REQ_TONE_THRESH_HI_RSP | 0x1B | |
| REQ_TONE_THRESH_LO | 0x1C | Request TONE Thresholds - low |
| REQ_TONE_THRESH_LO_RSP | 0x1D | |
| | | |
| EC_STAT_REQUEST | 0x20 | Request EC Status |
| EC_STAT_REQUEST_RSP | 0x21 | EC Status Report |
| GEN_TONE | 0x22 | Generate a user selectable tone |
| GEN_TONE_RSP | 0x23 | |
| GEN_DTMF_DIGITS | 0x24 | Send DTMF String |
| GEN_DTMF_DIGITS_RSP | 0x25 | |
| STOP_TONE | 0x26 | Stop sending a tone |
| STOP_TONE_RSP | 0x27 | |
| | | |
| DTMF_REPORT | 0xF0 | Report a DTMF digit detection |
| TONE_REPORT | 0xF1 | Report a Call progress tone detection |
| GEN_DTMF_COMPLETE | 0xF2 | Report completion of DTMF string generation |
| FAX_TONE_REPORT | 0xF3 | Report a Fax tone detection |

*Figure 44*

| Title | Bit 7 | Bit 6 | Bit 5 | Bit 4 | Bit 3 | Bit 2 | Bit 1 | Bit 0 | Octet |
|---|---|---|---|---|---|---|---|---|---|
| Session ID | Session ID (Low) | | | | | | | | 8 |
| | 1412 | 1411 Session ID (High) | | | | | | 1410 | 9 |
| EC Param | ADPT | CNG | NLP | MuteRout | MuteSout | Freeze | Clear | EC | 10 |
| | - | - | - | - | APSelect | ERL 1413 | | | 11 |

*Figure 45*

| Title | Bit 7 | Bit 6 | Bit 5 | Bit 4 | Bit 3 | Bit 2 | Bit 1 | Bit 0 | Octet |
|---|---|---|---|---|---|---|---|---|---|
| Status 1416 | Status LS byte | | | | | | | | 8 |
| | ... | | | | | | | | 9 |
| | ... | | | | | | | | 10 |
| | Status MS byte | | | | | | | | 11 |
| Session ID | Session ID (Low) | | | | | | | | 12 |
| | Session ID (High) | | | | | | | | 13 |
| - | Reserved | | | | | | | | 14 |
| - | Reserved | | | | | | | | 15 |

*Figure 46*

| Title | Bit 7 | Bit 6 | Bit 5 | Bit 4 | Bit 3 | Bit 2 | Bit 1 | Bit 0 | Octet |
|---|---|---|---|---|---|---|---|---|---|
| Session ID | Session ID (Low) | | | | | | | | 8 |
| | Session ID (High) | | | | | | | | 9 |
| | Reserved | | | | | | | | 10 |
| | Reserved | | | | | | | | 11 |

Figure 47

| Title | Bit 7 | Bit 6 | Bit 5 | Bit 4 | Bit 3 | Bit 2 | Bit 1 | Bit 0 | Octet |
|---|---|---|---|---|---|---|---|---|---|
| Status 1426 | Status LS byte | | | | | | | | 8 |
| | ... | | | | | | | | 9 |
| | ... | | | | | | | | 10 |
| | Status MS byte | | | | | | | | 11 |
| Session ID | Session ID (Low) | | | | | | | | 12 |
| | Session ID (Hi) | | | | | | | | 13 |
| EC Param | ADPT | CNG | NLP | MuteRout | MuteSout | Freeze | Clear | EC | 14 |
| | - | - | - | - | APSelect | ERL | | | 15 |

Figure 48

| Title | Bit 7 | Bit 6 | Bit 5 | Bit 4 | Bit 3 | Bit 2 | Bit 1 | Bit 0 | Octet |
|---|---|---|---|---|---|---|---|---|---|
| Session ID | Session ID (Low) | | | | | | | | 8 |
| | Session ID (High) | | | | | | | | 9 |
| | Reserved | | | | | | | | 10 |
| | Reserved | | | | | | | | 11 |

Figure 49

| Title | Bit 7 | Bit 6 | Bit 5 | Bit 4 | Bit 3 | Bit 2 | Bit 1 | Bit 0 | Octet |
|---|---|---|---|---|---|---|---|---|---|
| Status | Status LS byte ||||||||  8 |
|  | ... ||||||||  9 |
|  | ... |||||||| 10 |
|  | Status MS byte |||||||| 11 |
| Session ID | Session ID (Low) |||||||| 12 |
|  | Session ID (High) |||||||| 13 |
| Frame State | DTDS 1443 | DTRms 1442 | DTDet 1441 | SinDet 1440 | RinDet 1439 | LMS_Up 1438 | LMS_Init 1437 | EC_OFF 1436 | 14 |
|  | - | Tailx2 1450 | Tailx1 1449 | Tailx0 1448 | Resu 1447 | RIN 1446 | FE_prev 1445 | NLP_ST 1444 | 15 |
|  | - | - | - | - | - | - | - | - | 16 |
|  | - | - | - | - | - | - | - | - | 17 |
| Rin Status 1451 | Rin Ave Max Energy (Low) |||||||| 18 |
|  | Rin Ave Max Energy (High) |||||||| 19 |
|  | Rin Ave Energy (Low) |||||||| 20 |
|  | Rin Ave Energy (High) |||||||| 21 |
|  | Rin Energy Peak Decay (Low) |||||||| 22 |
|  | Rin Energy Peak Decay (High) |||||||| 23 |
|  | Rin Hang Over (Low) |||||||| 24 |
|  | Rin Hang Over (High) |||||||| 25 |
| Sin Status 1452 | Sin Ave Max Energy (Low) |||||||| 26 |
|  | Sin Ave Max Energy (High) |||||||| 27 |
|  | Sin Ave Energy (Low) |||||||| 28 |
|  | Sin Ave Energy (High) |||||||| 29 |
|  | Sin Energy Peak Decay (Low) |||||||| 30 |
|  | Sin Energy Peak Decay (High) |||||||| 31 |
|  | Sin Hang Over (Low) |||||||| 32 |
|  | Sin Hang Over (High) |||||||| 33 |
| Sout Status 1453 | Sout Ave Max Energy (Low) |||||||| 34 |
|  | Sout Ave Max Energy (High) |||||||| 35 |
|  | Sout Ave Energy (low) |||||||| 36 |
|  | Sout Ave Energy (high) |||||||| 37 |
| Double Talk 1454 | Double Talk Hang Over (Low) |||||||| 38 |
|  | Double Talk Hang Over (High) |||||||| 39 |

*Figure 50*

| Title | Bit 7 | Bit 6 | Bit 5 | Bit 4 | Bit 3 | Bit 2 | Bit 1 | Bit 0 | Octet |
|---|---|---|---|---|---|---|---|---|---|
| Session ID *1461* | \multicolumn{8}{c}{Session ID (Low)} ||||||||| 8 |
| | \multicolumn{8}{c}{Session ID (High)} ||||||||| 9 |
| Pulse Time | \multicolumn{8}{c}{Pulse Time (0-255 * 5ms)} ||||||||| 10 |
| Guard Time | \multicolumn{8}{c}{Guard Time (0-255 *5ms)} ||||||||| 11 |
| Inter-digit time | \multicolumn{8}{c}{Inter-digit Time (0-255 *5ms)} ||||||||| 12 |
| Volume | \multicolumn{8}{c}{Volume ( 0 to –63 dBm0), specify without sign} ||||||||| 13 |
| - | \multicolumn{8}{c}{Reserved} ||||||||| 14 |
| - | \multicolumn{8}{c}{Reserved} ||||||||| 15 |

*Figure 51*  — 1460, 1462, 1463, 1464, 1465

| Title | Bit 7 | Bit 6 | Bit 5 | Bit 4 | Bit 3 | Bit 2 | Bit 1 | Bit 0 | Octet |
|---|---|---|---|---|---|---|---|---|---|
| Status *1471* | Status LS byte ||||||||| 8 |
| | ... ||||||||| 9 |
| | ... ||||||||| 10 |
| | Status MS byte ||||||||| 11 |
| Session ID | Session ID (Low) ||||||||| 12 |
| | Session ID (High) ||||||||| 13 |
| | Reserved ||||||||| 14 |
| | Reserved ||||||||| 15 |

*Figure 52*  — 1470, 1472

| Title | Bit 7 | Bit 6 | Bit 5 | Bit 4 | Bit 3 | Bit 2 | Bit 1 | Bit 0 | Octet |
|---|---|---|---|---|---|---|---|---|---|
| Session ID | Session ID (Low) ||||||||| 8 |
| | Session ID (High) ||||||||| 9 |
| | Reserved ||||||||| 10 |
| | Reserved ||||||||| 11 |

*Figure 53*  — 1475, 1476

| Title | Bit 7 | Bit 6 | Bit 5 | Bit 4 | Bit 3 | Bit 2 | Bit 1 | Bit 0 | Octet |
|---|---|---|---|---|---|---|---|---|---|
| Status 1482 | Status LS byte ||||||||  8 |
| | ... |||||||| 9 |
| | ... |||||||| 10 |
| | Status MS byte |||||||| 11 |
| Session ID | Session ID (Low) |||||||| 12 |
| | Session ID (High) |||||||| 13 |
| Pulse Time | Pulse Time (0-255 *5ms) |||||||| 14 |
| Guard Time | Guard Time (0-255 *5ms) |||||||| 15 |
| Inter-digit time | Inter-digit Time (0-255 *5ms) |||||||| 16 |
| Volume | Volume (0 to –63dBm0) specified without sign |||||||| 17 |
| - | Reserved |||||||| 18 |
| - | Reserved |||||||| 19 |

*Figure 54*

| Title | Bit 7 | Bit 6 | Bit 5 | Bit 4 | Bit 3 | Bit 2 | Bit 1 | Bit 0 | Octet |
|---|---|---|---|---|---|---|---|---|---|
| Session ID | Session ID (Low) |||||||| 8 |
| | Session ID (High) |||||||| 9 |
| Control | Notify | X | Digit String Length (1-32)   1487 |||||| 10 |
| - | 1489 | Reserved ||||||| 11 |
| Digit IDs 1488 | Digit 1 ID |||||||| 12 |
| | Digit 2 ID |||||||| 13 |
| | Digit 3 ID |||||||| 14 |
| | Digit 4 ID |||||||| 15 |
| | ... |||||||| ... |
| | Digit 32 ID |||||||| 43 |

*Figure 55*

| Title | Bit 7 | Bit 6 | Bit 5 | Bit 4 | Bit 3 | Bit 2 | Bit 1 | Bit 0 | Octet |
|---|---|---|---|---|---|---|---|---|---|
| Status _1496_ | Status LS byte ||||||||  8 |
| | ... |||||||| 9 |
| | ... |||||||| 10 |
| | Status MS byte |||||||| 11 |
| Session ID | Session ID (Low) |||||||| 12 |
| | Session ID (High) |||||||| 13 |
| - | X | X | # of digits sent (0-32) |||||| 14 |
| - | Reserved |||||||| 15 |

| Title | Bit 7 | Bit 6 | Bit 5 | Bit 4 | Bit 3 | Bit 2 | Bit 1 | Bit 0 | Octet |
|---|---|---|---|---|---|---|---|---|---|
| Status _1496_ | Status LS byte |||||||| 8 |
| | ... |||||||| 9 |
| | ... |||||||| 10 |
| | Status MS byte |||||||| 11 |
| Session ID | Session ID (Low) |||||||| 12 |
| | Session ID (High) |||||||| 13 |
| - | Reserved |||||||| 14 |
| - | Reserved |||||||| 15 |

| Title | Bit 7 | Bit 6 | Bit 5 | Bit 4 | Bit 3 | Bit 2 | Bit 1 | Bit 0 | Octet |
|---|---|---|---|---|---|---|---|---|---|
| Session ID | Session ID (Low) |||||||| 8 |
| | Session ID (High) |||||||| 9 |
| Digit ID | X | X | Digit ID _1503_ |||||| 10 |
| End | End | _1502_ | Reserved |||||| 11 |
| Duration | DTMF Duration (12.75 ms units) LS Byte |||||||| 12 |
| | DTMF Duration MS Byte |||||||| 13 |
| Reserved | Reserved |||||||| 14 |
| | Reserved |||||||| 15 |

| Title | Bit 7 | Bit 6 | Bit 5 | Bit 4 | Bit 3 | Bit 2 | Bit 1 | Bit 0 | Octet |
|---|---|---|---|---|---|---|---|---|---|
| 1511 Frequency Indices | Freq 0 Index (0-36) ||||||||  8 |
| | Freq 1 Index (0-36) |||||||| 9 |
| | ... |||||||| ... |
| | Freq 14 Index (0-36) |||||||| 22 |
| | Reserved |||||||| 23 |
| 1512 Dictionary 1 Frequency Indices 15 = No Freq1 component | Tone 1 - Freq 1 Index (0-15) |||| Tone 0 - Freq 1 Index (0-15) |||| 24 |
| | Tone 3 - Freq 1 Index (0-15) |||| Tone 2 - Freq 1 Index (0-15) |||| 25 |
| | Tone 5 - Freq 1 Index (0-15) |||| Tone 4 - Freq 1 Index (0-15) |||| 26 |
| | ... |||||||| ... |
| | Tone 15 - Freq 1 Index (0-15) |||| Tone 14 - Freq 1 Index (0-15) |||| 31 |
| 1513 Dictionary 2 Frequency Indices 15 = No Freq2 component | Tone 1 - Freq 2 Index (0-15) |||| Tone 0 - Freq 2 Index (0-15) |||| 32 |
| | Tone 3 - Freq 2 Index (0-15) |||| Tone 2 - Freq 2 Index (0-15) |||| 33 |
| | Tone 5 - Freq 2 Index (0-15) |||| Tone 4 - Freq 2 Index (0-15) |||| 34 |
| | ... |||||||| ... |
| | Tone 15 - Freq 2 Index (0-15) |||| Tone 14 - Freq 2 Index (0-15) |||| 39 |
| 1514 Minimum Threshold | Threshold_min (Low byte) |||||||| 40 |
| | Threshold_min (High byte) |||||||| 41 |
| 1515 Twist | Twist (Low Byte) |||||||| 42 |
| | Twist (High Byte) |||||||| 43 |

*Figure 59*

| Title | Bit 7 | Bit 6 | Bit 5 | Bit 4 | Bit 3 | Bit 2 | Bit 1 | Bit 0 | Octet |
|---|---|---|---|---|---|---|---|---|---|
| Cadence Table: On times | Tone 0 On time (15ms units) [LS Byte] ||||||||  8 |
| | Tone 0 On time [MS Byte] |||||||| 9 |
| | Tone 1 On Time (15ms units) [LS Byte] |||||||| 10 |
| | Tone 1 On time [MS Byte] |||||||| 11 |
| | ... |||||||| ... |
| | Tone 15 On Time (15ms Units) [LS Byte] |||||||| 38 |
| | Tone 15 On Time [MS Byte] |||||||| 39 |

| Title | Bit 7 | Bit 6 | Bit 5 | Bit 4 | Bit 3 | Bit 2 | Bit 1 | Bit 0 | Octet |
|---|---|---|---|---|---|---|---|---|---|
| Cadence Table: Off times | Tone 0 Off time (15ms units) [LS Byte] |||||||| 8 |
| | Tone 0 Off time [MS Byte] |||||||| 9 |
| | Tone 1 Off Time (15ms units) [LS Byte] |||||||| 10 |
| | Tone 1 Off Time [MS Byte] |||||||| 11 |
| | ... |||||||| ... |
| | Tone 15 Off Time (15ms Units) [LS Byte] |||||||| 38 |
| | Tone 15 Off Time [MS Byte] |||||||| 39 |

| Title | Bit 7 | Bit 6 | Bit 5 | Bit 4 | Bit 3 | Bit 2 | Bit 1 | Bit 0 | Octet |
|---|---|---|---|---|---|---|---|---|---|
| Threshold Lo Table | Tone 0 threshold Lo (Low byte) | | | | | | | | 8 |
| | Tone 0 threshold Lo (High byte) | | | | | | | | 9 |
| | Tone 1 threshold Lo (Low byte) | | | | | | | | 10 |
| | Tone 1 threshold Lo (High byte) | | | | | | | | 11 |
| | ... | | | | | | | | ... |
| | Tone 15 threshold Lo (Low byte) | | | | | | | | 38 |
| | Tone 15 threshold Lo (High byte) | | | | | | | | 39 |

| Title | Bit 7 | Bit 6 | Bit 5 | Bit 4 | Bit 3 | Bit 2 | Bit 1 | Bit 0 | Octet |
|---|---|---|---|---|---|---|---|---|---|
| Threshold Hi Table | Tone 0 threshold Hi (Low byte) | | | | | | | | 8 |
| | Tone 0 threshold Hi (High byte) | | | | | | | | 9 |
| | Tone 1 threshold Hi (Low byte) | | | | | | | | 10 |
| | Tone 1 threshold Hi (High byte) | | | | | | | | 11 |
| | ... | | | | | | | | ... |
| | Tone 15 threshold Hi (Low byte) | | | | | | | | 38 |
| | Tone 15 threshold Hi (High byte) | | | | | | | | 39 |

| Title | Bit 7 | Bit 6 | Bit 5 | Bit 4 | Bit 3 | Bit 2 | Bit 1 | Bit 0 | Octet |
|---|---|---|---|---|---|---|---|---|---|
| Status 1541 | Status (LS Byte) | | | | | | | | 8 |
| | | | | | | | | | 9 |
| | | | | | | | | | 10 |
| | Status (MS Byte) | | | | | | | | 11 |

| Title | Bit 7 | Bit 6 | Bit 5 | Bit 4 | Bit 3 | Bit 2 | Bit 1 | Bit 0 |
|---|---|---|---|---|---|---|---|---|
| Status 1396 | Status (LS Byte) ||||||||
| | ||||||||
| | ||||||||
| | Status (MS Byte) ||||||||
| Frequency Indices | Freq 0 Index (0-36) ||||||||
| | Freq 1 Index (0-36) ||||||||
| | ... ||||||||
| | Freq 14 Index (0-36) ||||||||
| | Reserved ||||||||
| Dictionary 1 Frequency Indices | Tone 1 - Freq 1 Index (0-15) |||| Tone 0 - Freq 1 Index (0-15) ||||
| | Tone 3 - Freq 1 Index (0-15) |||| Tone 2 - Freq 1 Index (0-15) ||||
| | Tone 5 - Freq 1 Index (0-15) |||| Tone 4 - Freq 1 Index (0-15) ||||
| | ... ||||||||
| | Tone 15 - Freq 1 Index (0-15) |||| Tone 14 - Freq 1 Index (0-15) ||||
| Dictionary 2 Frequency Indices | Tone 1 - Freq 2 Index (0-15) |||| Tone 0 - Freq 2 Index (0-15) ||||
| | Tone 3 - Freq 2 Index (0-15) |||| Tone 2 - Freq 2 Index (0-15) ||||
| | Tone 5 - Freq 2 Index (0-15) |||| Tone 4 - Freq 2 Index (0-15) ||||
| | ... ||||||||
| | Tone 15 - Freq 2 Index (0-15) |||| Tone 14 - Freq 2 Index (0-15) ||||
| Minimum Threshold | Threshold_min (Low byte) ||||||||
| | Threshold_min (High byte) ||||||||
| Twist | Twist (Low Byte) ||||||||
| | Twist (High Byte) ||||||||

| Title | Bit 7 | Bit 6 | Bit 5 | Bit 4 | Bit 3 | Bit 2 | Bit 1 | Bit 0 | Octet |
|---|---|---|---|---|---|---|---|---|---|
| Session ID | Session ID (Low) | | | | | | | | 8 |
| | Session ID (High) | | | | | | | | 9 |
| Tone ID | X | X | X | X | Tone ID (0-15) | | | | 10 |
| Volume | Volume (0 to –63 dBm0) specify without sign | | | | | | | | 11 |
| Tone Duration | Tone Duration, 15ms units, 0 = continuous [LS Byte] | | | | | | | | 12 |
| | Tone Duration [MS Byte] | | | | | | | | 13 |
| - | Reserved | | | | | | | | 14 |
| - | Reserved | | | | | | | | 15 |

*Figure 66*

| Title | Bit 7 | Bit 6 | Bit 5 | Bit 4 | Bit 3 | Bit 2 | Bit 1 | Bit 0 | Octet |
|---|---|---|---|---|---|---|---|---|---|
| Status 1556 | Status (LS Byte) | | | | | | | | 8 |
| | ... | | | | | | | | 9 |
| | ... | | | | | | | | 10 |
| | Status (MS Byte) | | | | | | | | 11 |
| Session ID | Session ID (Low) | | | | | | | | 12 |
| | Session ID (High) | | | | | | | | 13 |
| - | Reserved | | | | | | | | 14 |
| - | Reserved | | | | | | | | 15 |

*Figure 67*

| Title | Bit 7 | Bit 6 | Bit 5 | Bit 4 | Bit 3 | Bit 2 | Bit 1 | Bit 0 | Octet |
|---|---|---|---|---|---|---|---|---|---|
| Session ID | Session ID (Low) | | | | | | | | 8 |
| | Session ID (High) | | | | | | | | 9 |
| Tone ID | X | X | X | X | Tone ID *1562* | | | | 10 |
| - | Reserved | | | | | | | | 11 |

*Figure 68*

| Title | Bit 7 | Bit 6 | Bit 5 | Bit 4 | Bit 3 | Bit 2 | Bit 1 | Bit 0 | Octet |
|---|---|---|---|---|---|---|---|---|---|
| Status *1566* | Status (LS Byte) | | | | | | | | 8 |
| | ... | | | | | | | | 9 |
| | ... | | | | | | | | 10 |
| | Status (MS Byte) | | | | | | | | 11 |
| Session ID | Session ID (Low) | | | | | | | | 12 |
| | Session ID (High) | | | | | | | | 13 |
| - | Reserved | | | | | | | | 14 |
| - | Reserved | | | | | | | | 15 |

*Figure 69*

| Title | Bit 7 | Bit 6 | Bit 5 | Bit 4 | Bit 3 | Bit 2 | Bit 1 | Bit 0 | Octet |
|---|---|---|---|---|---|---|---|---|---|
| Session ID | Session ID (Low) | | | | | | | | 8 |
| | Session ID (High) | | | | | | | | 9 |
| Tone ID | X | X | X | X | Tone ID (0-15) | | | | 10 |
| - | Reserved | | | | | | | | 11 |
| Tone Duration | Tone Duration, total ON time in 15 ms units [LS Byte] | | | | | | | | 12 |
| | Tone Duration [MS Byte] | | | | | | | | 13 |
| - | Reserved | | | | | | | | 14 |
| - | Reserved | | | | | | | | 15 |

*Figure 70*

| Title | Bit 7 | Bit 6 | Bit 5 | Bit 4 | Bit 3 | Bit 2 | Bit 1 | Bit 0 | Octet |
|---|---|---|---|---|---|---|---|---|---|
| Session ID | Session ID (Low) | | | | | | | | 8 |
| | Session ID (High) | | | | | | | | 9 |
| Tones | X | X | X | X | X | V21 | CNG | CED | 10 |
| - | Reserved | | | | | | | | 11 |

*Figure 71*

| Mnemonic | MsgCode | Description |
|---|---|---|
| SET_VOICE_PARMS | 0x00 | Set up Voice Parameters |
| SET_VOICE_PARMS_RSP | 0x01 | |
| REQ_VOICE_PARMS | 0x10 | Request Current Voice Parameters |
| REQ_VOICE_PARMS_RSP | 0x11 | |

*Figure 72*

| Title | Bit 7 | Bit 6 | Bit 5 | Bit 4 | Bit 3 | Bit 2 | Bit 1 | Bit 0 | Octet |
|---|---|---|---|---|---|---|---|---|---|
| Session ID | Session ID (Low) | | | | | | | | 8 |
| | 1614  1615 Session ID (High) | | | | | | | | 9 |
| Voice Parameters | ERES | DRES | Encoder Rate | | | Reserved | | | 10 |
| | ALC  1616 | | | SCE  1612 | | | HPFE | PFE | 11 |

1605

1606 — Session ID
1607 — Voice Parameters
1611 — HPFE
1610 — PFE

Figure 73

| Title | Bit 7 | Bit 6 | Bit 5 | Bit 4 | Bit 3 | Bit 2 | Bit 1 | Bit 0 | Octet |
|---|---|---|---|---|---|---|---|---|---|
| Status 1621 | Status (LS Byte) | | | | | | | | 8 |
| | ... | | | | | | | | 9 |
| | ... | | | | | | | | 10 |
| | Status (MS Byte) | | | | | | | | 11 |
| Session ID | Session ID (Low) | | | | | | | | 12 |
| | Session ID (High) | | | | | | | | 13 |
| 1622 - | Reserved | | | | | | | | 14 |
| - | Reserved | | | | | | | | 15 |

| Title | Bit 7 | Bit 6 | Bit 5 | Bit 4 | Bit 3 | Bit 2 | Bit 1 | Bit 0 | Octet |
|---|---|---|---|---|---|---|---|---|---|
| Session ID | Session ID (Low) | | | | | | | | 8 |
| | Session ID (High) | | | | | | | | 9 |
| 1626 - | Reserved | | | | | | | | 10 |
| - | Reserved | | | | | | | | 11 |

| Title | Bit 7 | Bit 6 | Bit 5 | Bit 4 | Bit 3 | Bit 2 | Bit 1 | Bit 0 | Octet |
|---|---|---|---|---|---|---|---|---|---|
| Status 1633 | Status (LS Byte) ||||||||  8 |
| | ... ||||||||  9 |
| | ... |||||||| 10 |
| | Status (MS Byte) |||||||| 11 |
| Session ID | Session ID (Low) |||||||| 12 |
| | Session ID (High) |||||||| 13 |
| Voice Parameters | ERES | DRES | Encoder Rate ||| Reserved || 14 |
| | ALC || SCE ||| HPFE | PFE | 15 |

| Mnemonic | MsgCode | Description |
|---|---|---|
| FAX_PARMS | 0x00 | Sets up Fax Parameters |
| FAX_PARMS_RSP | 0x01 | |
| REQ_FAX_PARMS | 0x02 | Request Current FAX Parameters |
| REQ_FAX_PARMS_RSP | 0x03 | |
| REPORT_FAX_DISCONNECT | 0xF0 | Report Fax DCN signal detected |

| Title | Bit 7 | Bit 6 | Bit 5 | Bit 4 | Bit 3 | Bit 2 | Bit 1 | Bit 0 | Octet |
|---|---|---|---|---|---|---|---|---|---|
| Session ID | Session ID (Low) ||||||||  8 |
| | Session ID (High) |||||||| 9 |
| FAX Parameters | System Delay *1711* |||| Max Modem Speed ||| 10 |
| | Reserved |||||| DBG *1712* | T38 | 11 |

| Title | Bit 7 | Bit 6 | Bit 5 | Bit 4 | Bit 3 | Bit 2 | Bit 1 | Bit 0 | Octet |
|---|---|---|---|---|---|---|---|---|---|
| Status 1716 | Status (LS Byte) ||||||||  8 |
|  | ... ||||||||  9 |
|  | ... |||||||| 10 |
|  | Status (MS Byte) |||||||| 11 |
| Session ID | Session ID (Low) |||||||| 12 |
|  | Session ID (High) |||||||| 13 |
| - | Reserved |||||||| 14 |
| - | Reserved |||||||| 15 |

| Title | Bit 7 | Bit 6 | Bit 5 | Bit 4 | Bit 3 | Bit 2 | Bit 1 | Bit 0 | Octet |
|---|---|---|---|---|---|---|---|---|---|
| Session ID | Session ID (Low) |||||||| 8 |
|  | Session ID (High) |||||||| 9 |
| - | Reserved |||||||| 10 |
| - | Reserved |||||||| 11 |

| Title | Bit 7 | Bit 6 | Bit 5 | Bit 4 | Bit 3 | Bit 2 | Bit 1 | Bit 0 | Octet |
|---|---|---|---|---|---|---|---|---|---|
| Status 1728 | Status (LS Byte) |||||||| 8 |
|  | ... |||||||| 9 |
|  | ... |||||||| 10 |
|  | Status (MS Byte) |||||||| 11 |
| Session ID | Session ID (Low) |||||||| 12 |
|  | Session ID (High) |||||||| 13 |
| FAX Parameters | System Delay |||| Max Modem Speed |||| 10 |
|  | Reserved |||||| DBG | T38 | 11 |

| Title | Bit 7 | Bit 6 | Bit 5 | Bit 4 | Bit 3 | Bit 2 | Bit 1 | Bit 0 | Octet |
|---|---|---|---|---|---|---|---|---|---|
| Session ID | Session ID (Low) | | | | | | | | 8 |
| | Session ID (High) | | | | | | | | 9 |
| - | Reserved | | | | | | | | 10 |
| - | Reserved | | | | | | | | 11 |

*Figure 82*

| Mnemonic | MsgCode | Description |
|---|---|---|
| MODEM_PARMS | 0x00 | Sets up Modem Parameters |
| MODEM_PARMS_RSP | 0x01 | |

*Figure 83*

| Title | Bit 7 | 6 | 5 | 4 | 3 | 2 | 1 | 0 | Octet |
|---|---|---|---|---|---|---|---|---|---|
| Flow Tag | Flow/Termination Tag (LSB) | | | | | | | | 0 |
| | Flow/Termination Tag (MSB) | | | | | | | | 1 |
| Payload Info | Payload Buffer Length (bits 7...0) | | | | | | | | 2 |
| | Payload Type | | | M | Payload buffer Length (10...8) | | | | 3 |
| Time-stamp | Timestamp LS byte | | | | | | | | 4 |
| | ... | | | | | | | | 5 |
| | ... | | | | | | | | 6 |
| | Timestamp MS byte | | | | | | | | 7 |
| Payload | Data | | | | | | | | 8 |
| | | | | | | | | | ... |
| | | | | | | | | | S + 8 |

*Figure 86*

1. Host sends SESSION_SETUP with Desired Session ID.

3a. Host sends SET_VOICE_PARMS (optional) with desired Session ID

4a. Host sends SESSION_START with desired Session ID

4c. Host checks HPRQSTAT_x and sends PACKET DATA to Receive-Data Queue

4e. Host checks HPXQSTAT_x and accepts PACKET DATA from Transmit-Data Queue.

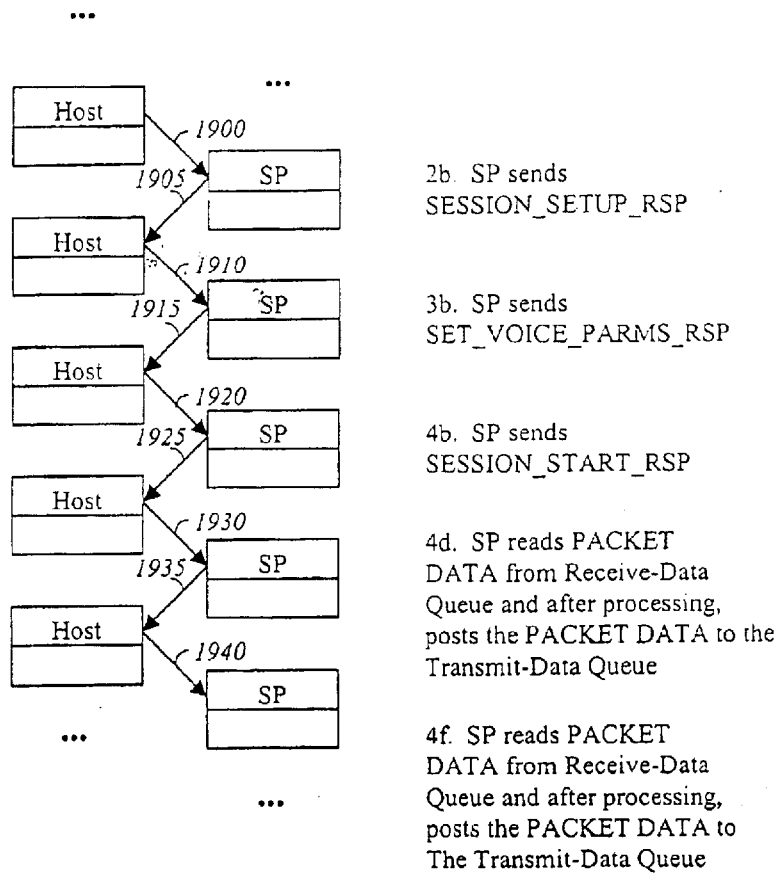

2b. SP sends SESSION_SETUP_RSP

3b. SP sends SET_VOICE_PARMS_RSP

4b. SP sends SESSION_START_RSP

4d. SP reads PACKET DATA from Receive-Data Queue and after processing, posts the PACKET DATA to the Transmit-Data Queue 4f. SP reads PACKET DATA from Receive-Data Queue and after processing, posts the PACKET DATA to The Transmit-Data Queue

*Figure 85*

| Payload Type (4-bit) | Description |
|---|---|
| 0 | Linear PCM Samples Frame |
| 1 | Encoded Voice Frame |
| 2 | Encoded Fax Frame |
| 3 | Encoded Data Frame |
| 4 | Bad Frame |
| 5 | Silence Frame |
| 6 | Telephony Signaling Event (TSE) |
| 7 | Telephony Tone |
| 8 | Transparent Data Frame |
| 9 | DTX Frame, valid for G711 and G729B codecs |
| 10..15 | Reserved |

*Figure 87*

| Title | Bit 7 | 6 | 5 | 4 | 3 | 2 | 1 | Bit 0 | Octet |
|---|---|---|---|---|---|---|---|---|---|
| PCM Sample 1 | | | | Sample # 1 (7..0) | | | | | 8 |
| | | | | Sample # 1 (15..8) | | | | | 9 |
| PCM Sample 2 | | | | Sample # 2 (7..0) | | | | | 10 |
| | | | | Sample # 2 (15..8) | | | | | 11 |
| ... | ... | | | | | | | | .. |
| | ... | | | | | | | | .. |
| PCM Sample M | | | | Sample # M (7..0) | | | | | 8+(M-1)*2 |
| | | | | Sample # M (15..8) | | | | | 9+(M-1)*2 |

*Figure 88*

| Title | Bit 7 | 6 | ... | Bit 0 | Octet |
|---|---|---|---|---|---|
| MSB Block 2031 | MSB/S8 | MSB/S7 | ... | MSB/S1 | 8 |
| | : | | : | | : |
| | MSB/S40 | MSB/S39 | ... | MSB/S33 | 12 |
| MSB-1 Block 2032 | (MSB-1)/S8 | (MSB-1)/S7 | ... | (MSB-1)/S5 | 13 |
| | : | | : | | : |
| | (MSB-1)/S40 | (MSB-1)/S39 | ... | (MSB-1)/S33 | 17 |
| : | | ... | | | |
| LSB Block | LSB/S8 | LSB/S7 | ... | LSB/S1 | 43 |
| | : | | : | | ... |
| | LSB/S40 | LSB/S39 | ... | LSB/S33 | 47 |

*Figure 89*

SYSTEM AND METHOD FOR CONTROLLING SIGNAL PROCESSING IN A VOICE OVER PACKET (VOP) ENVIRONMENT

The application claims the benefit of priority of U.S. Provisional Application No. 60/234,847 filed Sep. 22, 2000 and U.S. Provisional Application No. 60/234,743 filed Sep. 22, 2000.

FIELD

This invention generally relates to the field of signal processing. In particular, one embodiment of the invention relates to a system and method for controlling, configuring, monitoring and communicating with a signal processor without knowledge of its specific architecture.

GENERAL BACKGROUND

Single chip digital signal processing devices (DSP) are relatively well known. Typically, a DSP may be programmed by a general-purpose microprocessor commonly referred to as a "host processor". Currently, prior to programming the DSP, a software programmer must have a detailed understanding of the hardware architecture of the DSP. This requisite knowledge of the DSP architecture increases programming difficulties. Also, an interface of the DSP that enables communication with the host processor, sometimes referred to as the "host interface," is often configured to support only a few types of processors. This may cause the DSP to be incompatible for certain systems.

BRIEF DESCRIPTION OF THE DRAWINGS

The features and advantages of the invention will become apparent from the following detailed description of the invention in which:

FIG. 5 is an exemplary embodiment of a RXQ management register set of the DMA registers of FIG. 4.

FIG. 6 is an exemplary embodiment of a RXQ flow control register set of the DMA registers of FIG. 4.

FIG. 7 is an exemplary embodiment of a TXQ management register set of the DMA registers of FIG. 4.

FIG. 10 is an exemplary embodiment of the data structure of a message configured in accordance with the messaging protocol of the invention.

FIG. 11 is an exemplary embodiment of a control header of a control message used in messaging communications between the signal processor and the Host.

FIG. 12 is an exemplary listing of different types of message catalogs supported by the signal processor.

FIG. 13 is a listing of exemplary messages associated with the Device Control catalog of FIG. 12.

FIG. 14 is an exemplary payload of a node setup (DEV_SET_NODE) command message.

FIG. 15 is an exemplary payload of a response to the DEV_SET_NODE message of FIG. 14.

FIG. 16 is an exemplary payload of a response to a device information request (DEV_INFO) command message.

FIG. 17 is an exemplary payload of a device memory pool initialization (DEV_POOL_INIT) command message.

FIG. 18 is an exemplary payload of a response to the DEV_POOL_INIT command message of FIG. 17.

FIG. 19 is an exemplary payload of a device report configuration (DEV_REPORT_CONFIG) command message.

FIG. 20 is an exemplary payload of a response to the DEV_REPORT_CONFIG command message of FIG. 19.

FIG. 21 is an exemplary payload of a device heartbeat (DEV_HEARTBEAT) message.

FIG. 22 is an exemplary payload of a device statistics (DEV_STATISTICS) message.

FIG. 23 is an exemplary payload of a serial port setup (SERIAL_PORT_SETUP) command message.

FIG. 24 is an exemplary payload of a response to the SERIAL_PORT_SETUP command message of FIG. 23.

FIG. 25 is an exemplary payload of a segment allocation (SEG_ALLOC) command message.

FIG. 26 is an exemplary payload of a response to the SEG_ALLOC command message of FIG. 25.

FIG. 27 is an exemplary payload of a response to a Segment Activate (SEG_ACTIVATE) command message.

FIG. 28 is an exemplary listing of messages associated with a Session Control catalog.

FIG. 29 is an exemplary payload of a session setup (SESSION_SETUP) command message.

FIG. 30 is an exemplary embodiment of types of encoder and decoder functions associated with the SESSION_SETUP command message of FIG. 29.

FIG. 31 is an exemplary embodiment of echo cancellation setup options associated with the SESSION_SETUP command message of FIG. 29.

FIG. 32 is an exemplary embodiment of a Test Mode parameter of FIG. 29.

FIG. 33 is an exemplary embodiment of valid Near and Far Receive (RX) and Transmit (TX) addresses of FIG. 29.

FIG. 34 is an exemplary payload of a response to the SESSION_SETUP command message of FIG. 29.

FIG. 35 is an exemplary payload of a session start (SESSION_START) command message.

FIG. 36 is an exemplary payload of a response to the SESSION_START command message of FIG. 35.

FIG. 37 is an exemplary payload of a session stop (SESSION_STOP) command message.

FIG. 38 is an exemplary payload of a response to the SESSION_STOP message of FIG. 37.

FIG. 39 is an exemplary payload of a session teardown (SESSION_TEARDOWN) command message.

FIG. 40 is an exemplary payload of a response to the SESSION_TEARDOWN message of FIG. 39.

FIG. 41 is an exemplary payload of a session query (SESSION_QUERY) command message.

FIG. 42 is an exemplary payload of a response to the SESSION_QUERY message of FIG. 41.

FIG. 43A is an exemplary payload of a session statistics request (SESSION_STATS_REQUEST) command message.

FIG. 43B is an exemplary payload of a response to the SESSION_STATS_REQUEST command message of FIG. 43A.

FIG. 44 is an exemplary listing of messages associated with a Telephony Services catalog.

FIG. 45 is an exemplary payload featuring echo cancellation (EC) parameters of a set echo cancellation parameters (SET_EC_PARMS) command message.

FIG. 46 is an exemplary payload of a response to the SET_EC_PARMS command message of FIG. 45.

FIG. 47 is an exemplary payload of a Request EC Parameters (REQ_EC_PARMS) command message.

FIG. 48 is an exemplary payload of a response to a REQ_EC_PARMS message of FIG. 47.

FIG. 49 is an exemplary payload of an echo cancellation statistic request (EC_STAT_REQ) command message.

FIG. 50 is an exemplary payload of a response to the EC_STAT_REQ message of FIG. 49.

FIG. 51 is an exemplary payload of a Set DTMF Parameters (SET_DTMF_PARMS) command message.

FIG. 52 is an exemplary payload of a response to the SET_DTMF_PARMS command message of FIG. 51.

FIG. 53 is an embodiment of an exemplary payload of a REQ_DTMF_PARMS command message.

FIG. 54 is an exemplary payload of a response to the REQ_DTMF_PARMS command message of FIG. 53.

FIG. 55 is an exemplary payload of a Generate DTMF Digits (GEN_DTMF_DIGITS) command message.

FIG. 56 is an exemplary payload of an acknowledgment control message.

FIG. 57 is an exemplary payload of a response to the GEN_DTMF_DIGITS command message of FIG. 55.

FIG. 58 is an exemplary payload of a DTMF Report (DTMF_REPORT) command message.

FIG. 59 is an exemplary payload of a set tone frequency (SET_TONE_FREQ) command message.

FIG. 60 is an exemplary payload of a set ON-time for tone cadence (SET_TONE_CADENCE_ON) command message.

FIG. 61 is an exemplary payload of a set OFF-time for tone cadence (SET_TONE_CADENCE_OFF) command message.

FIG. 62 is an exemplary payload of a set tone threshold low (SET_TONE_THRESH_LOW) command message.

FIG. 63 is an exemplary payload of a set tone threshold hi (SET_TONE_THRESH_HI) command message.

FIG. 64 is an exemplary payload of a response used in responding to each of the set tone command messages.

FIG. 65 is an exemplary payload of a REQ_TONE_FREQ_RSP command.

FIG. 66 is an exemplary payload of a Tone Generate (GEN_TONE) command message.

FIG. 67 is an exemplary payload of a response to the GEN_TONE command message of FIG. 66.

FIG. 68 is an exemplary payload of a Stop Tone (STOP_TONE) command message.

FIG. 69 is an exemplary payload of a response to the STOP_TONE command message of FIG. 68.

FIG. 70 is an exemplary payload of a Tone Report (TONE_REPORT) command message.

FIG. 71 is an exemplary payload of a Fax Tone Report (FAX_TONE_REPORT) command message.

FIG. 72 is an exemplary listing of messages associated with a Voice Services catalog.

FIG. 73 is an exemplary payload of a SET_VOICE_PARMS command message.

FIG. 74 is an exemplary payload of a response to the SET_VOICE_PARMS command message of FIG. 73.

FIG. 75 is an exemplary payload of a REQ_VOICE_PARMS command message.

FIG. 76 is an exemplary payload of a response to the REQ_VOICE_PARMS command message of FIG. 75.

FIG. 77 is an exemplary listing of messages associated with a Fax Services catalog.

FIG. 78 is an exemplary payload of a SET_FAX_PARMS command message.

FIG. 79 is an exemplary payload of a response to the SET_FAX_PARMS command message of FIG. 78.

FIG. 80 is an exemplary payload of a REQ_FAX_PARMS command message.

FIG. 81 is an exemplary payload of a response to the REQ_FAX_PARMS command message of FIG. 80.

FIG. 82 is an exemplary payload of a report fax disconnect (REPORT_FAX_DISCONNECT) command message.

FIG. 83 is a listing of exemplary messages associated with a Modem Services catalog.

FIG. 85 is an exemplary embodiment of a flow diagram of the sequence of control messages exchanged between the Host and signal processor to set up and run a telephone connection session.

FIG. 86 is an exemplary embodiment of a data message.

FIG. 87 is an exemplary embodiment of formats supported by the payload type parameter contained in the data header of the data message of FIG. 86.

FIG. 88 is an exemplary payload of the data message of FIG. 86 supporting 16-bit PCM samples.

FIG. 89 is another exemplary payload of the data message of FIG. 86.

DESCRIPTION

The invention generally relates to a system and messaging protocol for controlling a signal processor without knowledge of its specific architecture. For instance, in one embodiment, the invention relates to a message-based, command/response communication protocol for controlling, configuring, monitoring and communicating with a signal processor.

In the following description, certain terminology is used to describe features of the invention. A "Voice-over-Packet (VoP) subsystem" can be generally defined as logic that receives, processes and transmits information (e.g., data, address, control, voice or a combination thereof) in a prescribed format. Each VoP subsystem may be configured to support multiple types of networks.

"Logic" is defined as hardware, firmware, software or any combination thereof. For instance, internal logic within the VoP subsystem may include a processor, which is hardware operating in combination with firmware or software to processing information. There exist various types of processors such as a signal processor that processes audio (e.g., voice) and perhaps other types of information.

Typically, both firmware and software are generally defined as one or more instructions that, when executed, cause the system to perform a certain operation. Perhaps forming an application, applet, program or routine, the instructions are stored in machine-readable medium, which is any medium that can store and transfer information. Examples of machine-readable medium include, but are not limited or restricted to an electronic circuit, a semiconductor memory device (volatile or non-volatile), a data storage disk (e.g. mechanical or optical hard drive) or even any portable storage media such as a diskette, a compact or digital video disc, tape and like. The machine-readable medium may further include information-carrying medium being electrical wire, optical fiber, cable, bus, air in combination with wireless signaling technology or any combination thereof.

The term "packet" is generally defined as a series of information bits sent over a packet-switched network. Examples of packet-switched networks include Asynchronous Transfer Mode (ATM), frame relay, Internet Protocol (IP). These packets are routed over communication paths, which are formed using information-carrying mediums as those described above. Other measurements of bit or byte lengths include a segment, block or data element.

A "parameter" is generally defined herein as a bit value, pointer or other mechanism used to initiate an event such as a transfer of information. A "field" is generally defined as one or more parameters associated with specific byte(s) of a message.

The terms "set" or "clear" normally indicate a logical state such as logic "1" or "0," respectively.

I. Architecture Overview

Figure 1:
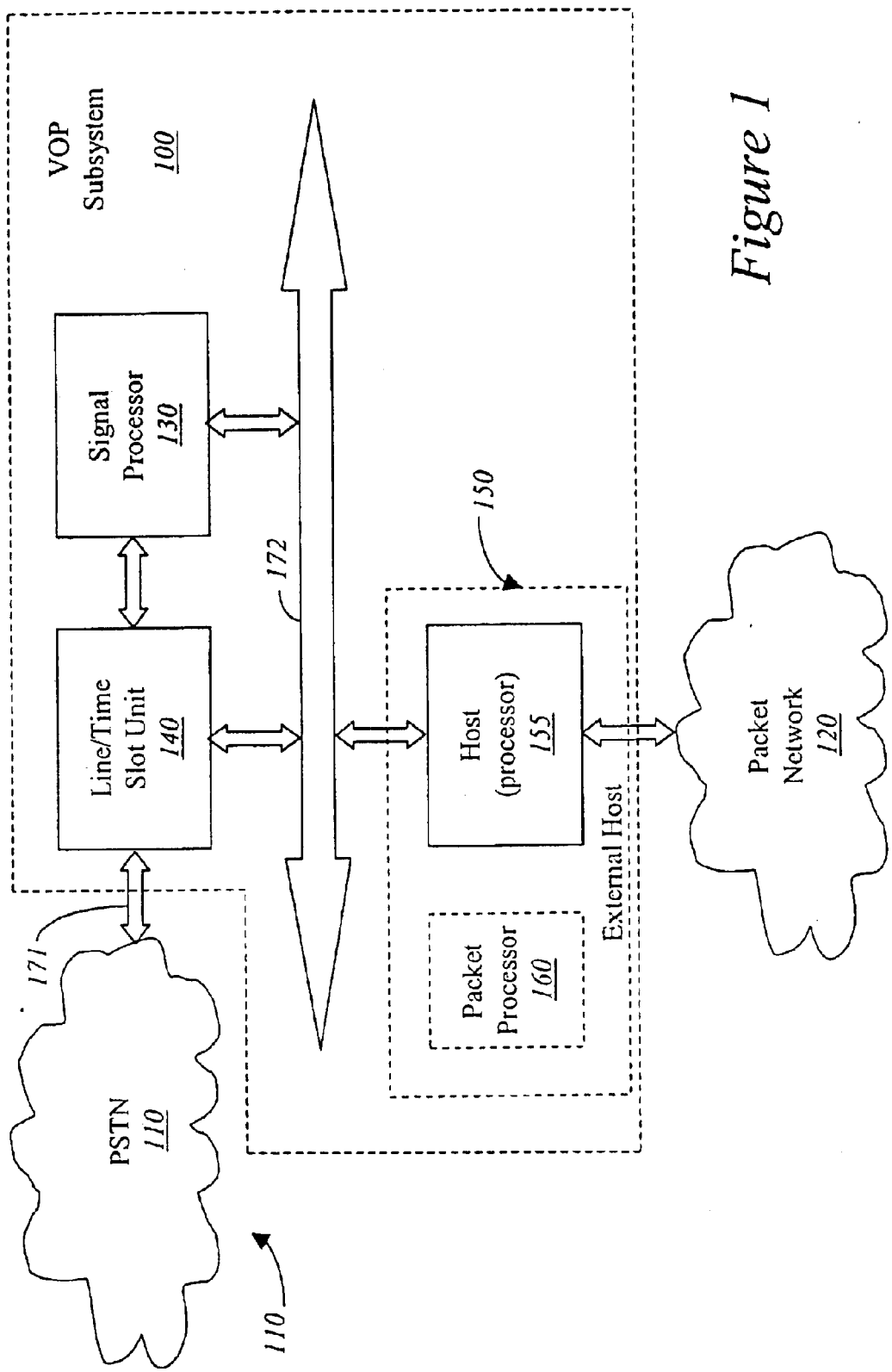
FIG. 1 is a first exemplary embodiment of a VoP subsystem.

Referring now to FIG. 1, a first exemplary embodiment of a VoP subsystem 100 is illustrated. Capable of being implemented within a variety of products (e.g., gateway, switch), the VoP subsystem 100 is in communication with different types of networks such as a public switched telephone network (PSTN) 110 and a packet-switched network 120. The packet network 120 supports the transfer of voice packets or other packet types such as video, electronic mail (e-mail) and the like.

For this embodiment, the VoP subsystem 100 includes a signal processor 130, a line/time slot unit 140 and an external controller 150 such as a host processor (hereinafter referred to as a "Host"). Of course, the "Host" may be configured as another type of controller such as a microcontroller, an application specific integrated circuit (ASIC) and the like. These logic nodes 130, 140 and 150 are coupled together by a plurality of links.

Figure 4:
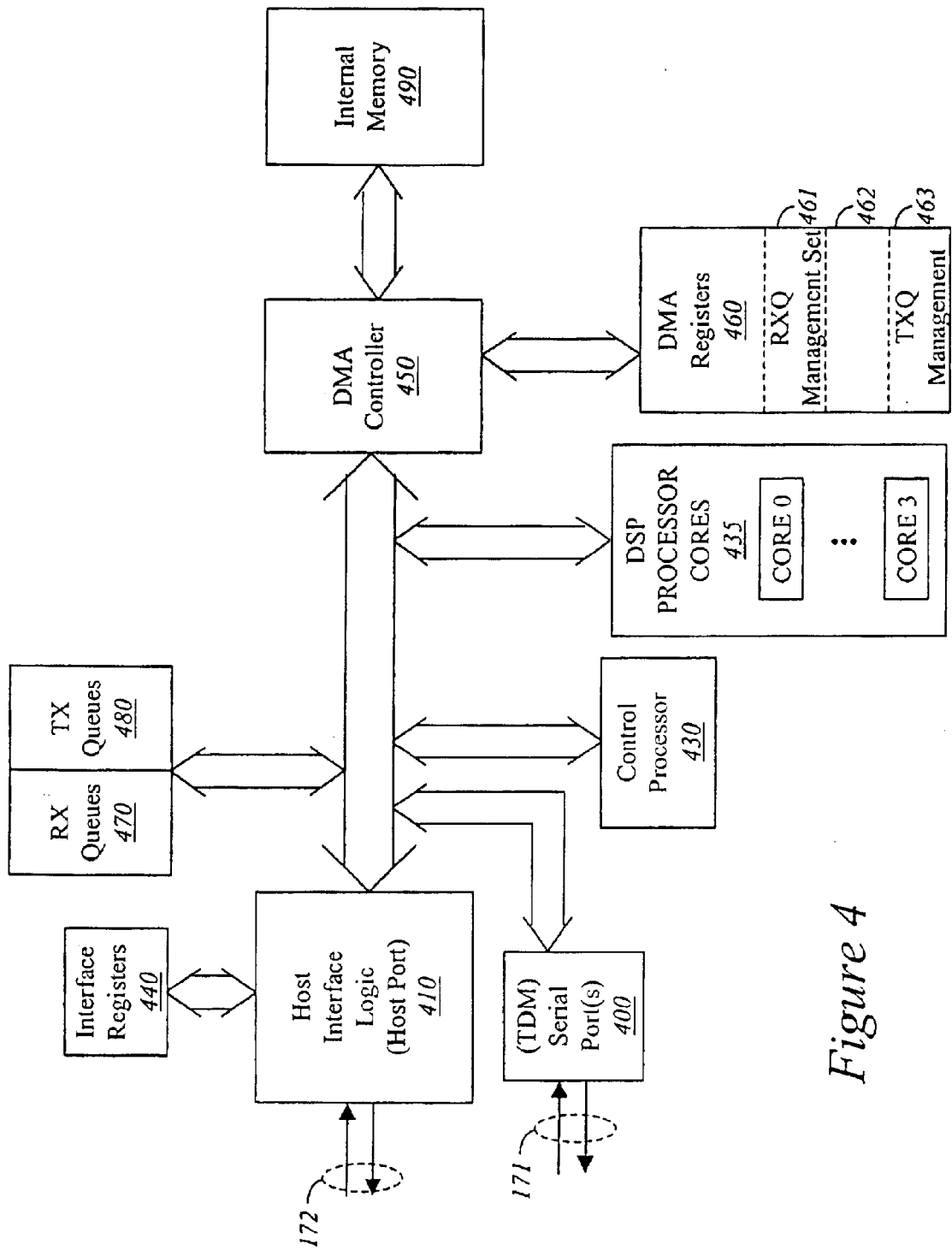
FIG. 4 is an exemplary embodiment of internal logic employed within the signal processor of FIG. 3.

The signal processor 130 is configured to receive and transmit voice over a first communication path 171 and packetized information over a second communication path 172 (see also FIG. 4). In particular, messages may be produced by the Host 150 and routed to the signal processor 130 over the second communication path 172. One type of message is a "control message" that is responsible for booting, initializing and configuring the signal processor 130 as well as monitoring and controlling its run-time operations. Another type of message is a "data message" used in the transport of information over the PSTN 110 or packet network 120.

Information maybe routed from the PSTN 110 to the packet network 120 and vice versa. For instance, according to one embodiment, the PSTN 110 is adapted to send uncompressed voice over first communication path 171. The first communication path 171 is configured to operate in accordance with a selected multiplexing scheme such as Time Division Multiplexing (TDM) as shown or Frequency Division Multiplexing (FDM). The uncompressed voice may be encoded through a variety of modulation techniques such as pulse code modulation (PCM) for example. The uncompressed voice then is provided to the line/time slot unit 140, which extracts the uncompressed voice and places the voice into time slots accessible by the signal processor 130.

Thereafter, the signal processor 130 compresses the voice and converts the compressed voice into one or more voice packets. The voice packets are routed over the second communication path 172 to the Host 150. The Host 150 (perhaps a host processor 155 alone or operating in conjunction with a packet processor 160 as shown) adds appropriate headers in order to convert the voice packets into packets having a suitable network format (e.g., IP, ATM, etc.). The Host 150 transmits the network packets to the network 120. For this embodiment, the second communication path 172 is a 32-bit multi-master, multiplexed address/data parallel bus that serves as a primary interface for both control and data messages as described below.

Conversely, in order to convert incoming network packets into uncompressed voice transmitted over the PSTN 110, upon receiving the network packets, the Host 150 strips its header and performs operations for removal of jitter. The stripped packets are then routed to the signal processor 130 via the second communication path 172. The signal processor 130 decodes the packetized voice and performs echo cancellation before transmission to the line/time slot unit 140 for transmission over the PSTN 110.

Figure 2:
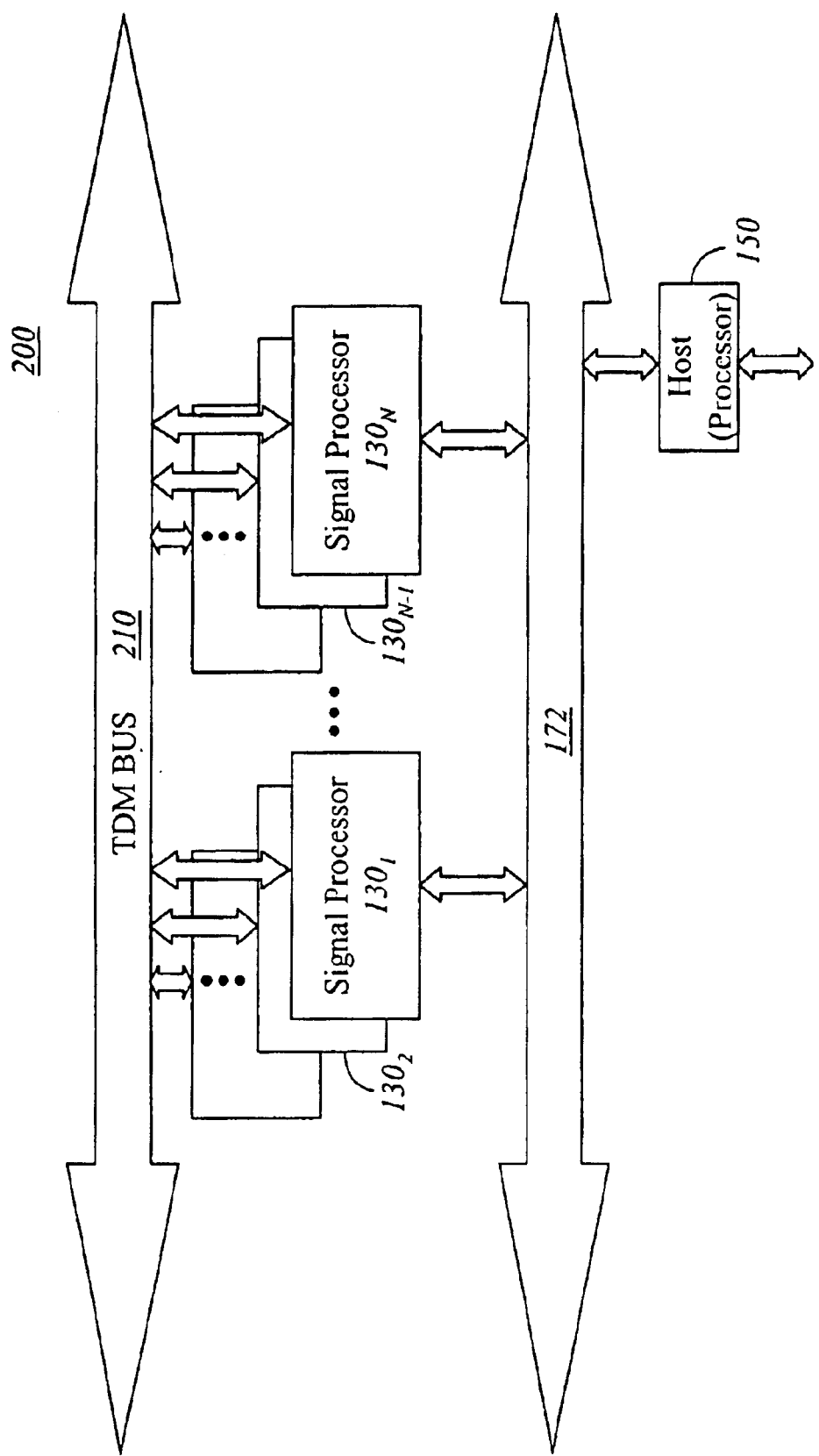
FIG. 2 is a second exemplary embodiment of a VoP subsystem.

Referring to FIG. 2, a second exemplary embodiment of a VoP subsystem 200 is illustrated. The VoP subsystem 200 includes a communication path 210 that enables communications between multiple (N) signal processors $130_1$–$130_N$ (where N>1). Herein, as shown, the communication path 210 is a TDM bus featuring a plurality of time division multiplexed channels. It is contemplated, however, that the communication path 210 may be configured to support a plurality of frequency division multiplexed channels or spread spectrum (e.g., Code Division Multiple Access "CDMA" based technologies). The Host 150 is in communication with each of the signal processors $130_1$–$130_N$ over communication path 172 for transmission and reception of control or data messages for configuration and run-time operations by the signal processors $130_1$–$130_N$.

Figure 3:
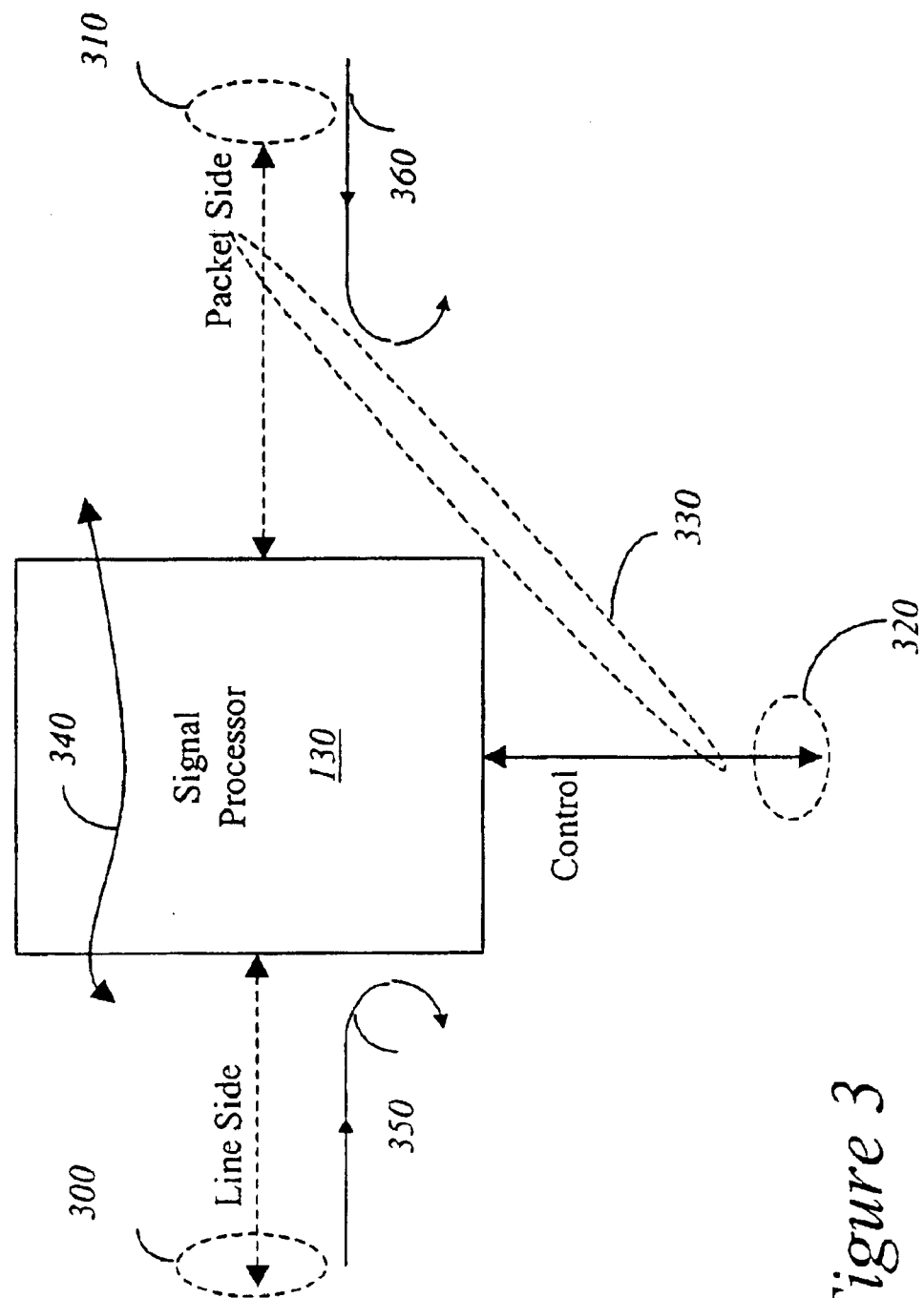
FIG. 3 is a logical representation of an embodiment of a signal processor of the VoP subsystem of FIG. 1 or 2.

Referring now to FIG. 3, a logical representation of an embodiment of a signal processor 130 of the VoP subsystem of FIG. 1 or 2 is illustrated. The signal processor 130 comprises three logical interfaces, namely a line-side interface 300, a packet-side interface 310 and a control interface 320. Both the packet-side interface 310 and the control interface 320 may operate as a "host interface" 330, which allows the Host to communicate with the signal processor 130.

The line-side interface 300 propagates uncompressed voice over several channels while the packet-side interface 310 propagates compressed voice over several connections. As a result, the signal processor 130 is adapted to encode (e.g., compress) voice received via the line-side interface 300 and route the encoded voice over the packet-side interface 310 on a channel-by-channel basis. Similarly, the signal processor 130 is adapted to decode (e.g., decompress) voice received via the packet-side interface 310 and route the decoded voice over the line-side interface 300. The control interface 320 operates as a message advanced programming interface (API) to communicate with and control, configure and monitor operations of the signal processor 130.

During run-time, the signal processor 130 supports a plurality of communication sessions. A "communication session" is defined as signal processing activity on the signal processor 130 involving two data flows (or four channels). Usually, a communication session (hereinafter referred to as a "session") involves the transfer of data between the line-side interface 300 and the packet-side interface 310 as represented by flow 340. However, other types of sessions may simply involve data flows 350 and 360 over the line-side interface 300 or the packet-side interface 310, respectively. All run-time operations occur through a message layer abstraction over the host interface 330.

As shown in FIGS. 3 and 4, the signal processor 130 includes a plurality of input/output (I/O) ports, including multiple (TDM) serial ports 400 and a host port 410. The logical interfaces 300, 310 and 320 may be mapped to these I/O ports in a variety of ways. For instance, the line-side interface 300 may be physically mapped into the serial ports 400 and both the packet-side and control interfaces 310 and 320 may be physically mapped to the host port 410 forming the host interface 330 as shown in FIG. 3. Another example is that the line-side interface 300 is mapped into the serial ports 400, the packet-side interface 310 is mapped to the host port 410 and the control interface 320 is mapped to a separate cell-based serial port being one of the serial ports 400. Yet another example could be that all three interfaces 300, 310 and 320 are mapped to the host port 410 or separate serial ports 400 (the line-side being byte-based and the packet-side and control interfaces being cell-based ports).

Referring now to FIG. 4, an exemplary embodiment of internal logic employed within the signal processor 130 of FIG. 3 is shown. The signal processor 130 features serial ports 400 and more notably the host port 410 that allows information to be received by and transmitted to the Host. Internal logic within the signal processor 130 comprises a control processor 430, DSP processing cores 435, interface registers 440, a direct memory access (DMA) controller 450, DMA registers 460, receive (RX) queues 470, transmit (TX) queues 480 and internal memory 490.

More specifically, interface registers 440 enable the Host to gain ownership of the second communication path 172 and transfer information into the internal memory 490 of the signal processor 130. These registers 440 may be configured as input/output (I/O) memory address space of the signal processor 130 and are accessible via the host port 410.

The RX and TX queues 470 and 480 are specialized hardware linked to the internal memory 490 and controlled by the DMA controller 450. The DMA controller 450 supports delivery of incoming frame, a collection of one or more packets, to certain RX queues 470 and extracting outgoing packets at least one of the TX queues 480. The RX queues 470 and TX queues 480 may be allocated in a variety of ways.

For instance, in one embodiment, a substantial majority of the RX queues 470 may be dedicated to receive packetized data while at least one remaining RX queue may be dedicated to receive control messages. Herein, 509 out of 512 RX queues are used to receive data packets and at least one RX queue is used to receive control messages.

Additionally, at least one TX queue may be dedicated to temporarily store data scheduled for transmission to the Host. One or more other TX queues may be dedicated to temporarily store control messages for example.

The DMA registers 460 are used by the Host to ascertain flow control status and to indicate when a frame has been fully transferred to the signal processor. For this embodiment, the DMA registers 460 include RX queue (RXQ) management register sets 461, a RXQ flow control register set 462 and TXQ management register sets 463. The control processor 430 initializes the DMA registers 460 at bootup.

As shown in FIG. 5, each of the RXQ management register sets 461 uniquely corresponds to one of the RX queues 480 of FIG. 4 and may be associated with one or more communication channels (a generic channel is identified by the modifier "_x"). In particular, each RXQ management register set 461 includes a host processor request status (HPRQSTAT_x) register 500, a host processor request data (HPRQDATA_x) register 505 and a host processor request status (HPRQDONE_x) register 510.

In one embodiment, the Host polls the state of the HPRQSTAT_x register 500 to determine the flow control status of RX queue $470_x$, namely whether it is full or not full. If the RX queue $470_x$ is not full, represented by HPRQSTAT_x register 500 not being set, for example, a packet is written into the HPRQDATA_x register 505. For this embodiment, the data packet, namely four bytes (or octets) is written at one time. After writing the last four bytes into the HPRQDATA_x register 505, the HPRQDONE_x register 510 is set by the Host to indicate the end of the frame transfer. If the RX queue is full, represented when the HPRQSTAT_x register 500 is set, the Host continues polling or services another session.

Referring to FIG. 6, one embodiment of the RXQ flow control register set 462 includes a host processor channel request status (HPCRQS) bit 515 and a host processor channel request frame (HPCRQF) bit 520. The HPCRQS bit 515 indicates a flow control status for all channels supported by the signal processor. Thus, when the HPCRQS bit 515 is set, the RX queues are either full or disabled and invalid. However, when the HPCRQS bit 515 is not set, the Host may route packets into a RX queue for transfer to the internal memory 490. The HPCRQF bit 520 is set when a frame is fully transferred to a RX queue, thereby interrupting the control processor regarding the received data for subsequent routing to the internal memory 490.

Referring to FIG. 7, each TXQ management register set 463 uniquely corresponds to one of the TX queues and includes a host processor transmit status (HPXQSTAT_x) register 525, a host processor transmit data (HPXQDATA_x) register 530 and a host processor transmit done count (HPXQDCNT_x) register 535. The Host either receives an interrupt from the signal processor when information is placed within a TX queue or can periodically poll the TX queue. For either communication scheme, a particular bit of the HPXQSTAT_x register 525, when set, indicates when packets are loaded into a corresponding TX queue. The remaining bits are used to indicate the size of the transmitted frame (in 32-bit units) to be read.

If that particular bit of the HPXQSTAT_x register 525 is set, information loaded in the TX queue is read through the HPXQDATA_x register 530. The information may be data packets, control and debug messages for example. The HPXQDCNT_x register 535 provides information to the control processor in order to free or recycle allocated memory.

Figure 8:
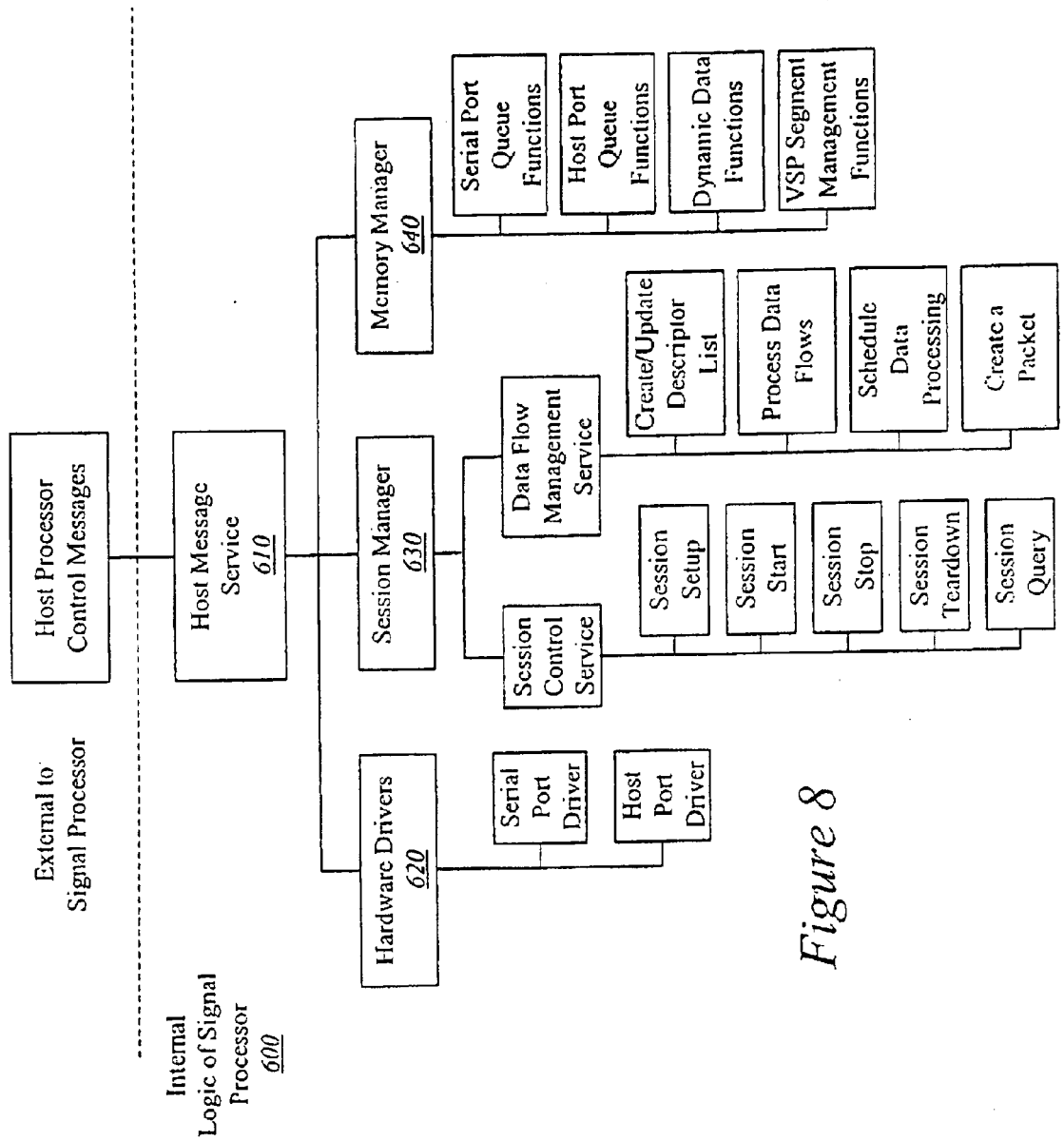
FIG. 8 is an exemplary embodiment of internal logic within the control processor of FIG. 4.

Referring now to FIG. 8, an exemplary embodiment of internal logic 600 within the control processor 440 is illustrated. The internal logic 600 of the control processor 430 includes a host message service 610 that receives control messages from the Host in accordance with a messaging protocol described below. The control messages provide various services based on the type of control message received. The types of messages received by the host message service 610 are normally provided to internal hardware driver logic 620, a session manager 630 or a memory manage 640.

The hardware driver logic 620 includes a serial port driver used to enable and establish communication channels over which TDM (non-packetized) voice samples are transceived. The hardware driver logic 620 further includes a host port driver through which the host port is controlled and through which voice packets are transceived.

The session manager 630 is responsible for controlling sessions and the data flow over the communication channels. For this embodiment, sessions are established and activated through a command/response messaging protocol generally based on a SESSION_SETUP, SESSION_SETUP_RSP, SESSION_START and SESSION_START_RSP messages (see FIGS. 29–36 below). The sessions are halted and terminated through SESSION_STOP, SESSION_STOP_RSP, SESSION_TEARDOWN and SESSION_TEARDOWN_RSP messages (see FIGS. 37–40 below). Periodically, the parameters and history associated with the session may be extracted using the SESSION_QUERY command message (see FIGS. 41 and 42 below).

The memory manager 640 controls the inflow and outflow of information from the RX and TX queues as well as the internal memory.

II. Messaging Protocol

A. General Overview

Figure 9:
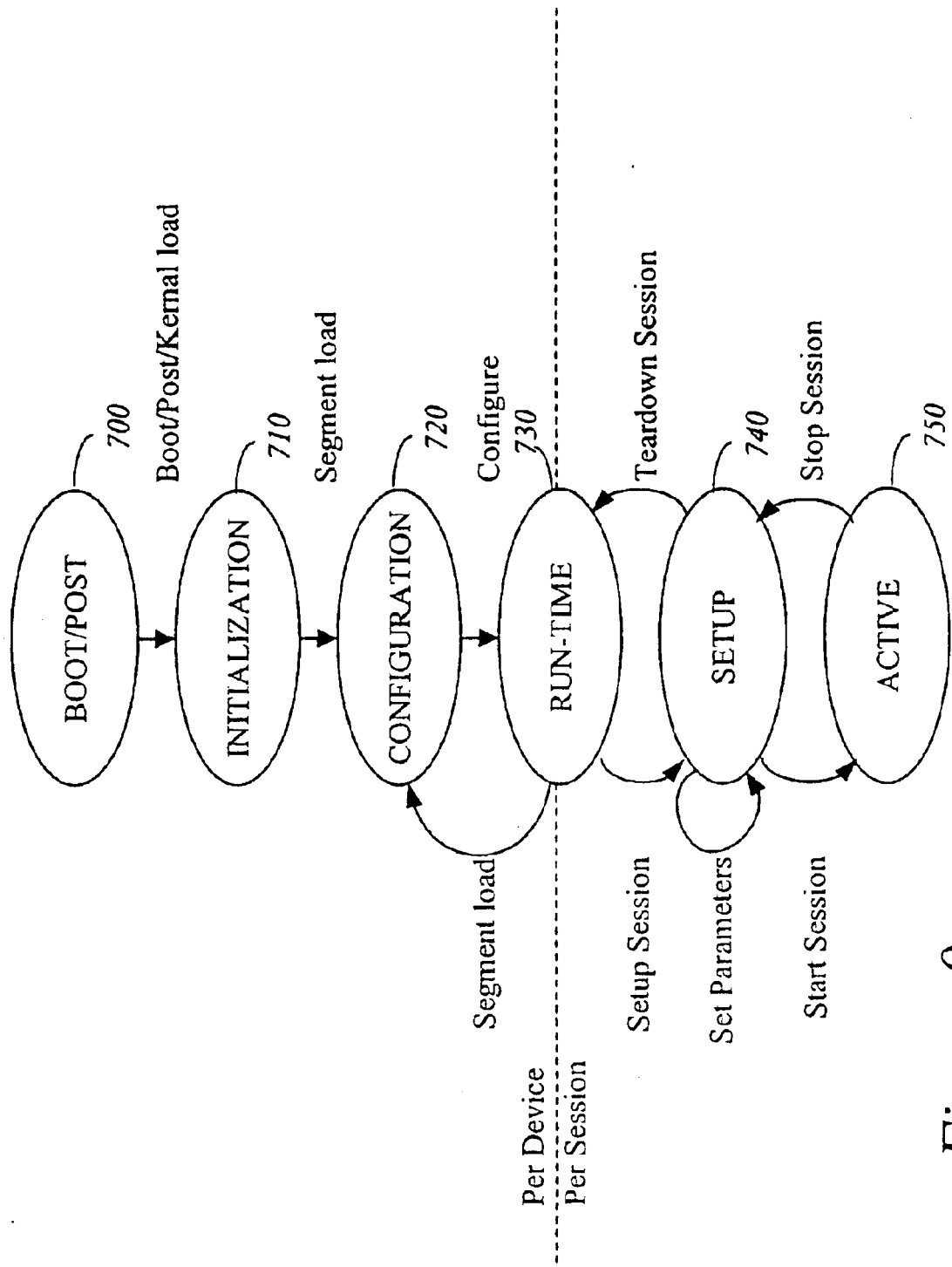
FIG. 9 is an exemplary flowchart of an embodiment of the basic operations performed by the signal processor in communication with a Host.

Referring now to FIG. 9, an exemplary flowchart of an embodiment of the basic operations performed by the signal processor in communication with a Host is shown. The control operations on the signal processor are broadly categorized into four phases: (1) Boot/POST phase 700, (2) Initialization phase 710, (3) Configuration phase 720, and (4) Run-time phase 730. These control operations occur over the Host interface. Since the internal memory and interface registers of the signal processor are memory mapped and visible through the host interface for this embodiment, the Boot and Initialization phases 700 and 710 may be carried out by directly accessing address space for memory within the signal processor. However, the Configuration and Run-time phases 720 and 730 occur through a message layer abstraction. During the Run-time phase 730, Setup and Activate phases 740 and 750 are used to establish (i.e., setup), start, stop and terminate (i.e., tear down) sessions during run-time.

1. Boot Phase

Upon power on reset, all processor cores of the signal processor are placed in a RESET state. A "Power On Self Test" (POST) and run-time kernel image are loaded into the internal memory of the signal processor. One processor core is then taken out of its RESET state in order to boot the VoP subsystem and perform a POST and diagnostics of the signal processor. This involves testing the self-testable logic within the signal processor including the processor cores and generating a status report at a fixed global memory location. If the POST operation fails, an error message is sent and execution is stopped. Otherwise, the processor core continues to the Initialization phase 710.

2. Initialization Phase

Upon a successful Boot phase 700, the Initialization phase 710 commences. The Initialization phase 710 involves initialization of (i) application software and/or firmware within the signal processor, (ii) the host and serial ports, (iii) the functionality of the control processor, and the like. If any of the initializations operations fail, an initial fail error code together with the detailed error status is placed into a prescribed global memory location. Otherwise, at the end of successful initializations, the signal processor loads information into the global memory location to indicate completion of the Initialization phase 710.

3. Configuration Phase

Upon successful completion of the Initialization phase 710, the Configuration phase 720 commences. In part, the Configuration phase 720 includes (i) device configuration, (ii) segment download, and (iii) default service parameter setup.

For device configuration, once booted, the signal processor is configured by the Host using device control messages. These messages are used to (a) assign a node identification (referred to herein as a "Node ID") which is used to identify the signal processor, (b) configure memory pools used by various application threads, and (c) configure the serial ports. The format of the device control messages is described in FIGS. 14–22 shown below.

In general, device configuration may be performed according to the following procedure:

Send a node setup (DEV_SET_NODES) command message in order to configure the signal processor with a Node ID and provide information concerning the Host to the signal processor. Besides PING and ECHO command messages, no other messages will be accepted by the signal processor before this message is sent.

Send a device memory pool initialization (DEV_POOL_INIT) command message to configure memory pools, and a serial port setup (SERIAL_PORT_SETUP) command message to configure the serial ports. The SERIAL_PORT_SETUP command message is sent, even if no TDM data will be present.

Download segments of software or firmware to the signal processor. Each segment is a small collection of blocks of code or data.

After completion, the signal processor will accept all control command messages except DEV_SET_NODES, DEV_POOL_INIT and SERIAL_PORT_SETUP, which have been executed previously.

The downloaded software or firmware may be executed in segments or blocks of code/data that can be rapidly loaded, executed and unloaded using DMA in and out of the DSP processing cores when needed. Each segment of the software or firmware is loaded into internal memory of the signal processor by the following procedure:

Host sends a segment allocation (SEG_ALLOC) message of FIGS. 25–26 with the size (in octects) of the software (or firmware) to be downloaded. The signal processor reserves an area in internal memory to accommodate the software or firmware of the size specified and returns the starting address of that reserved area in memory. If there is insufficient memory available, the signal processor returns an error code indicating there is not enough memory.

Host writes binary image(s) of segment(s) of software or firmware directly to the internal memory of the signal processor beginning at the starting address specified.

When finished, the host processor sends a Segment Activate (SEG_ACTIVATE) message of FIG. 27 so that the signal processor can activate the segment(s) downloaded.

For default service parameter setup, there are two types of parameter blocks: a default parameter block and a session parameter block. The purpose of this configuration operation is to set the default parameters for all services to the values needed for the application.

Herein, the "default parameter block" is a global block that holds configurable parameters of all services. The default parameter block is loaded initially with values programmed in firmware, called factory defaults. Upon creation, every session gets a copy of parameters from this block. The value of a parameter in the default parameter block can be changed using various control messages described below. The effect of any default parameter change lasts until it is changed again or until the signal processor is reset.

The "session parameter block" holds parameters unique to that session. When a session is setup, session parameter block is created with parameter values copied from default parameter block. It is also possible to change the session parameters via certain control messages. The effect of this change lasts as long as the session is active (until tear down). This change does not affect the default setting of the parameter.

4. Run-Time Phase

Upon completion of the Configuration phase 720, the signal processor is ready to run sessions. All run-time operations will occur through a message layer abstraction over the host interface. The Host transmits messages to the signal processor and receives response messages therefrom. From time to time, the signal processor generates status/event information sent to the Host. This information will come asynchronously to the Host via unsolicited status messages. An example of a status message is "DTMF Tone detected" message on a particular session.

As shown in FIG. 10, the messages are described in terms of bytes (or octets). Messages and data received by the signal processor over the host interface utilize a 32-bit data bus. The format of the message bytes within the 32-bit words is shown where the first byte 810 in a message 800 occupies the right most (lowest) 8-bits of the 32-bit word, and the fourth byte 820 in the message occupies the left most (upper) 8-bits of the 32-bit word.

B. Control Messages

Control messages are transmitted between the Host and the signal processor to control, configure, monitor and communicate with the signal processor without knowledge of its specific architecture. Each control message comprises a control header as described below. For this embodiment, the control header is eight bytes (bytes 0–7) in length, although other control header structured may be used. Typically, each control message further comprises a payload to transmit additional information. For this embodiment, the payload begins at "octet 8" of the control message. However, some control messages simply include a control header only (e.g., DEV_INFO command message).

1. Control Header

Referring now to FIG. 11, an exemplary embodiment of a control header 900 used in messaging communications in order to prompt the signal processor to initiate a control task is illustrated. For the VoP subsystem, several signal processors could be interconnected to a local host bus. Moreover, several logical channels (control, packet, TDM) could be multiplexed a single bus. The control header 900 uniquely addresses each node and demultiplexes all control flows to and from the signal processor.

Herein, the control header 900 comprises a message header portion that includes a Destination Node parameter 910, a Source Node parameter 920, a Priority parameter 930, a Message Length parameter 940 and a Message Type parameter 950. The Destination Node parameter 910 includes information that uniquely identifies the destination node (e.g., signal processor or Host) for which the control message is intended. The Source Node parameter 920 includes information that uniquely identifies the source node (e.g., Host or signal processor) from which this control message is initiated. This information may be of value for responding to a command message.

The Priority parameter 930 includes information that provides a priority level associated with the message. For this embodiment, the priority level is represented by a 2-bit value, giving a combination of four priority levels. For example, priority "00" may be associated with the lowest priority level and "11" is represented as the highest priority level.

The Message Type parameter 950 includes information that identifies the message type. For one embodiment, a control message type may be defined by "01".

The Message Length parameter 940 includes information that indicates the entire length of the control message in bytes, not including the control header 900. As shown, the length is an 11-bit value, giving a maximum message size of 2047 bytes. Of course, other bit lengths may be used other than those described herein for illustrative purposes.

The control header 900 further comprises a control header portion that includes a Control Length parameter 970, a Catalog parameter 980, a Code parameter 990 and perhaps an optional Sequence Number parameter 960. The Sequence Number parameter 960 is supplied by the originator of the control message 900 as a means for message synchronization. The destination node would simply copy and return the sequence number back in its response.

The Control Length parameter 970 includes information that indicates the length in bytes associated with the particular control operation (not including the control header). This enables multiple control packets (each associated with an operation) to be transferred in a single control message. For this purpose, the control message 900 may require additional (multiple) control header portions (e.g., its own parameters 960, 970, 980 and/or 990), each associated with control packets for a particular operation. A control length of zero is legitimate for control messages with no payload.

The Catalog parameter 980 includes information that indicates a particular class of the control message. These classes are partitioned into several logically related message catalogs. For instance, a "Device Control catalog" includes functions that are used to initialize, configure and control run-time of the signal processor. The "Session Control catalog" includes functions that are used to setup, manage and tear down sessions as well as resource management for the sessions. Also, there exist various Services catalogs (e.g., Telephony, Voice, Fax, Modem) that manage algorithms, their parameter blocks and algorithm resources. While one executive task handling all these catalogs, the logical association helps partition the control messages into a flexible framework, where functionality can be easily moved around or ported to higher level.

The Code parameter 990 includes information that indicates the particular type of operation within the given catalog.

2. Message Catalogs

Referring now to FIG. 12, an exemplary listing of different types of message catalogs supported by the signal processor is shown. The message catalogs 1000 classify control messages according to selected functional groupings. The types of message catalogs may include, but are not limited or restricted to device control 1010, session control 1020, telephony services 1030, voice services 1040, fax services 1050, and modem services 1060. The control messages of these message catalogs include a control header (described above) and a payload. The payloads are described below in sections 2a–2f.

2a. Device Control Catalog

Referring now to FIG. 13, a listing of exemplary messages associated with a Device Control catalog 1010 is illustrated. The Device Control catalog 1010 may contain messages related to device initialization, configuration and run-time operations of the signal processor. The type of messages is identified by the contents of the Code parameter within an incoming control message.

Referring to FIG. 14, an exemplary payload of a node setup (DEV_SET_NODE) command message 1100 is illustrated. A DEV_SET_NODE command message 1100, inclusive of its control header (see FIG. 11) and payload, is sent by the Host to the signal processor in order to (i) establish at least one Node ID to identify this signal processor in the control messages and (ii) identify which Host is to receive autonomous messages from this signal processor. The DEV_SET_NODE command message 1100 may be sent to the signal processor immediately after power-on initialization is complete because the signal processor does not accept other messages, except PING and ECHO test messages, until the Node ID has been configured.

In particular, the payload of the DEV_SET_NODE command message 1100 includes a Signal Processor Node ID 1101 which may be used as the destination node in control message sent from the Host to the signal processor. Alternatively, the Signal Processor Node ID 1101 may be used as the source node in all response messages sent by the signal processor. The payload of the DEV_SET_NODE command message 1100 further includes a Host Node ID 1102 that is used as the destination node in the control header of all autonomous messages sent by the signal processor.

Referring now to FIG. 15, an exemplary payload of a response 1105 to the DEV_SET_NODE command message 1100 of FIG. 14 is illustrated. The response, referred to as the DEV_SET_NODE_RSP message 1105, contain values that indicate completion of the DEV_SET_NODE command message 1100. A Status parameter 1106 may be loaded with information that indicates successful completion status of the DEV_SET_NODE command message 1100. For example, the Status parameter 1104 may include a predetermined status code value (e.g., x00H). Other code values may be used to indicate a particular error.

Referring now to FIG. 16, an exemplary payload of a response 1110 to a device information request (DEV_INFO) command message is illustrated. The DEV_INFO command message (not shown) is transmitted from the Host to the signal processor in order to request information pertaining to the signal processor. The DEV_INFO command message only includes a control header with approximately loaded parameters. The response to the DEV_INFO command message, referred to as a "DEV_INFO_RSP" message 1110, is returned for every DEV_INFO command message from the Host. The DEV_INFO_RSP message 1110 includes device information pertaining to the version of signal processor 1111, the version of internal logic 1112, and a size of the internal memory 1113.

Referring now to FIG. 17, an exemplary payload of a device memory pool initialization (DEV_POOL_INIT) command message 1115 is illustrated. Provided by the Host to the signal processor, the DEV_POOL_INIT command message 1115 configures the memory pools.

As shown, the payload of the DEV_POOL_INIT command message 1115 comprises (i) a serial buffer configuration parameter 1116, (ii) a host port buffer configuration parameter 1117, and (iii) a dynamic memory buffer configuration parameter 1118. The serial buffer configuration parameter 1116 includes information that indicates the size (in bytes) and the number of serial port buffers to be allocated. The host port buffer configuration parameter 1117 includes information that indicates the size (in bytes) and number of host port buffer memory used in connection with RX and TX data queues. The dynamic memory buffer configuration parameter 1118 includes information that indicates the size (in bytes) and number of dynamic memory buffers to be allocated (these buffers are used for session dynamic data).

Referring to FIG. 18, an exemplary payload of a response 1120 to the DEV_POOL_INIT command message of FIG. 17 is illustrated. The response, referred to as a DEV_POOL_INIT_RSP message 1120, is provided by the signal processor for every DEV_POOL_INIT command message 1115 sent from the Host. The DEV_POOL_INIT_RSP message 1120 includes a Status parameter 1121. The Status parameter 1121 includes information that indicates successful completion of the DEV_POOL_INIT command message 1115.

Referring now to FIG. 19, an exemplary payload of a device report configuration (DEV_REPORT_CONFIG) command message 1125 is shown. Provided by the Host, the DEV_REPORT_CONFIG command message 1125 configures the signal processor to periodically send DEV_HEARTBEAT and/or DEV_STATISTICS messages as described in FIGS. 21 and 22. Normally sent after the signal processor has finished its boot sequence, the DEV_REPORT_CONFIG command message 1125 comprises a device heartbeat frequency parameter 1126. This parameter is set to a value representative of the approximate periodicity for the signal process to transmit the DEV_HEARTBEAT command message. The DEV_REPORT_CONFIG command message 1125 further comprises a device statistics (DEV_STATISTICS) frequency parameter 1127, which is set to a value representative of the approximate periodicity for transmitting the DEV_STATISTICS command message. The periodicity in transmitting the DEV_HEARTBEAT and/or DEV_STATISTICS command messages may be configured in 10 millisecond "ms" intervals, for example.

Referring to FIG. 20, an exemplary payload of a response to the DEV_REPORT_CONFIG command message of FIG. 19 is shown. The response, referred to herein as a DEV_REPORT_CONFIG_RSP message 1130, includes a status parameter 1131. The status parameter 1131 contains information to indicate successful completion of the DEV_REPORT_CONFIG command message 1125 of FIG. 19.

Referring now to FIG. 21, an exemplary payload of a device heartbeat (DEV_HEARTBEAT) message 1135 is shown. The DEV_HEARTBEAT message 1135 is a periodic message sent by the signal processor if the DEV_HEARTBEAT frequency is set to a non-zero value in the DEV_REPORT_CONFIG command 1125 of FIG. 19. The DEV_HEARTBEAT message 1135 includes a heartbeat number 1136, which is a monotonic count value for this embodiment.

Referring now to FIG. 22, an exemplary payload of a device statistics (DEV_STATISTICS) message 1140 is shown. The DEV_STATISTICS message 1140 is a periodic status message sent by the signal processor if enabled via DEV_REPORT_CONFIG command 1125 of FIG. 19. This message includes statistics on the signal processor including one or more of the following:

parameter 1141—the total number of sessions serviced during power-on of the signal processor;

parameter 1142—the number of sessions currently active;

parameter 1143—the amount of loading experienced by all DSP processor cores of the signal processor due to processing requirements of all active sessions;

parameter 1144—the total number of setup failures experienced during power-on of the signal processor;

parameter 1145—the total number of start failures experienced during power-on of the signal processor;

parameters 1146 and 1147—TDM overflows being the number of new events (since power-on) that have been placed on a serial port before an old event has completed processing; TDM underflows being the number of events (since power-on) that the serial port has been ready to transmit but no frame is available;

parameter 1148—bad port events being the number of unanticipated events experienced by a serial or host port during power-on;

parameter 1149—number of jobs (frame processing events) queued;

parameters 1150—total jobs completed during power-on for each of the processor cores.

Referring to FIG. 23, an exemplary payload of a serial port setup (SERIAL_PORT_SETUP) command message 1155 is shown. Transmitted from the Host to the signal processor, the SERIAL_PORT_SETUP command message 1155 configures a given serial port. For instance, the (TDM) serial ports on the signal processor may receive uncompressed PCM voice samples in accordance with G.711 standards. Thus, in order to configure the serial ports, various controls and modes for clock, frame sync, channels, etc. are needed to work properly with a wide variety of external hardware components.

As shown, the SERIAL_PORT_SETUP command message 1155 comprises a Port parameter 1156, a Receive (RX) Control field 1157, a RX Channel Control field 1158, a RX Clock Control field 1159, a RX Frame Sync control field 1160, a Transmit (TX) Control field 1161, a TX channel control field 1162, a TX clock field 1163, and a TX Frame Sync control field 1164. Since the functionality supported by parameters of the RX-based field 1157–1160 is generally equivalent to the functionality supported by parameters of the TX-based fields 1161–1164, the operations of the RX-based parameters are only discussed in detail. These parameters represent the programmability of the signal processor serial port interface hardware to connect to a variety of external components.

In particular, the Port parameter 1156 includes a serial port number (SPNUM) that identifies the particular port number being set up. Since the signal processor features four serial ports for this embodiment, the serial port number ranges from 0–3.

The RX Control field 1157 is used for controlling the Receive functionality of the serial port interface of the signal processor. For instance, the RX Control field 1157 includes a Frame Sync Source (FSS) parameter 1165, a Frame Sync Polarity (FSP) parameter 1166, a Data Clock source (DCS) parameter 1167, a Data Clock Polarity (DCP) parameter 1168, a Data Bit Delay (DBD) parameter 1169, a Data Element Size (DES) parameter 1170, a Data Element Reversal (DER) parameter 1171, a Frame Sync Drive (FSD) parameter 1172 and a Clock Drive (CKD) parameter 1173.

The FSS parameter 1165 includes information that is used to indicate whether a supplied Frame Sync is to be used or ignored. For instance, if the Frame Sync is supplied by the external source, as represented by the FSS parameter being a logical value of "0", the Frame Sync is ignored. However, if the Frame Sync is supplied by an internal source, as represented by FSS parameter being a logical value of "0", the Frame Sync is applied.

The FSP parameter 1166 indicates whether the synchronization is applied to a rising edge or falling edge of the signal. As shown, FSP parameter 1166 is cleared ("0") if synchronization is coordinated on the rising edge and set ("1") if synchronization is coordinated on the falling edge.

The DCS parameter 1167 indicates whether an internal or external data clock source should be used (external—logic "0") or ignored (internal—logic "1").

The DCP parameter 1168 indicates whether the clock polarity is based on the rising edge (logic "0") or falling edge (logic "1") of the signal.

The DBD parameter 1169 includes information that specifies how much bit delay should be added to the Frame Sync to capture the first bit of the first data element an incoming frame. In this embodiment, zero bits to two bits are valid values for DBD parameter 1169.

The DES parameter 1170 includes information that specifies how wide each data element in the incoming TDM frame is, in terms of number of bits. A frame is composed of multiple data elements between Frame Sync signals. For instance, a data element of a G.711-law or A-law frame is configured to be eight (8) bits and may be represented by a DES parameter value of "00". If pulse code modulation is used, 16-bit data elements are used as represented by the logical value "01".

The DER parameter 1171 includes information that specifies if the data element should be bit reversed before being provided to the DMA controller of the signal processor. With respect to a receive port, the DER parameter 1171, when cleared may represent that the bit pattern for data element should not be reversed. However, the DER parameter 1171, when set may represent that the bit pattern should be reversed. For a transmit port, logical values of "1" or "0" may represent that the bit pattern for data element should not or should be reversed, respectively.

The FSD parameter 1173 includes information that specifies whether or not an internal Frame Sync is to be used to drive an external logic device. For example, a logical value of "0" indicates that the internal Frame Sync is not used to drive the external logic device while logical value of "1" indicates that the internal Frame Sync is used to drive the external logic device.

The CKD parameter 1173 includes information that specifies if internal clock source is to be used to drive the external logic device. For example, a logical value of "0" indicates that the internal clock source is not used to drive the external logic device while a logical value of "1" indicates that the internal clock source is used to drive the external logic device.

The Rx Channel Control field 1158 provides serial port RX channel settings. For example, the RX Channel Control field 1158 includes a Receive Channel Start (RCS) parameter 1175 that specifies the starting time-slot or channel number in multiples of 4, from which this receive port should begin receiving elements. Valid numbers are 0, 4, 8, 12, . . . 1020. The Rx Channel Control field 1158 further includes a Receive Channel Count (MAX-RCC) 1176 that contains a value specifying the number of time-slots or channels to capture starting at RCS location.

The RX Clock Control field 1159 provides serial port RX clock settings. The RX Clock Control field 1159 includes a clock divider (DIV) parameter 1180, a source mode (SM) parameter 1181, a clock polarity (SP) parameter 1182, a clock enable (EN) parameter 1183 and an internal clock sync (SNC) parameter 1184. Specifically, the DIV parameter

1180 includes information that specifies the clock ratio with respect to the system clock. The SM parameter 1181 includes information that specifies the source of the internal clock; namely, whether the internal clock is based on an external clock or a system clock.

Additionally, the SP parameter 1182 includes information that determines whether the clock divider will divide the clock on the positive or negative edge of the internal clock (e.g., "0"=positive edge, "1"=negative edge). The EN parameter 1183, when set, enables internal clock generation. The SNC parameter 1184 includes information that synchronizes the internal clock to an external frame sync (SNC="1") or is free-running (SNC="0").

The RX FS Control field 1160 provides Serial Port Rx Frame Sync Settings for internal Frame Sync generation. The Rx FS Control field 1160 includes a frame period (FPER) parameter 1185 that specifies the frame period in terms of number of bits at the current clock rate. The Rx FS Control field 1160 further includes a generator output (GO) parameter 1186 and a frame sync enable (EN) parameter 1187. The GO parameter 1186, when set, enables internal frame sync generator and over-rides external frame syncs. The EN parameter 1187 includes information for enabling Frame Sync generation.

Referring now to FIG. 24, an exemplary payload of a response 1200 to the SERIAL_PORT_SETUP command message 1155 of FIG. 23 is illustrated. The response, referred to as the SERIAL_PORT_SETUP_RSP message 1200, includes a Status parameter 1201 and a Port field 1202. The Status parameter 1201 includes information that indicates whether or not the operations of the SERIAL_PORT_SETUP command message 1155 have been successfully completed. If so, for example, a selected status code value (e.g., logical value of "0") is loaded as the Status parameter 1201. Otherwise, another code values may be used to indicate a particular error.

The Port field 1202 includes an enable (EN) parameter 1205 and a serial port number (SPNUM) parameter 1206 that is equivalent to the values of the EN and SPNUM parameters 1183 and 1156 of the SERIAL_PORT_SETUP command message 1155 of FIG. 23 for return to the Host.

Referring to FIG. 25, an exemplary payload of a segment allocation (SEG_ALLOC) command message 1210 is shown. The SEG_ALLOC command message 1210 is transmitted by the host to the signal processor in order to request that memory space be reserved for an image of software or firmware for loading into the signal processor. A memory space size parameter 1211 includes information that indicates (in bytes) the size of the image to be loaded.

Referring now to FIG. 26, an exemplary payload of a response 1215 to the SEG_ALLOC command message 1210 of FIG. 25 is illustrated. The response, referred to as a SEG_ALLOC_RSP message 1215, is returned by the signal processor for every SEG_ALLOC command message from the Host. Upon determining that it can accept new segment(s) of software or firmware of the given memory size, the signal processor returns the SEG_ALLOC_RSP message 1180 containing a Status parameter 1216 to indicate completion of the SEG_ALLOC command message 1210 and a memory start address parameter 1217. The memory start address parameter 1217 includes a starting byte address of the memory area, relative to the base address associated with the internal memory of the signal processor.

Referring now to FIG. 27, an exemplary payload of a response to a Segment Activate (SEG_ACTIVATE) command message is illustrated. Transmitted from the Host to the signal processor, the SEG_ACTIVATE command message (not shown) requests activation of an image (software or firmware) that was most recently loaded into the signal processor. This control message features no payload but is merely identified through selection of appropriate Catalog and Code parameters. As show, a response to the SEG_ACTIVATE command, a SEG_ACTIVATE_RSP message 1220, determines the accuracy of the transported data by verifying the size, segment type, etc. and returns information as the Status parameter 1221 to represent such accuracy. If an error occurs during processing of this segment data, the signal processor frees the memory allocated by the previous SEG_ALLOC command message (see FIG. 25), and returns an error code in the Status parameter 1221.

The ECHO or PING messages are transmitted from the Host. The PING command message is used to test communication between the signal processor and the host. This message has no payload but its control header specifies "Device Control" in the Catalog parameter (0x00) and a "PING" test message (0xEE) in the Code parameter. The signal processor will send an identical PING message back to the Host as a response. The ECHO command message is also used to test communications between the signal processor and the host. The control header for the ECHO command message specifies "Device Control" (0x00) in the Catalog parameter and an ECHO test message (0xEF) in the Code parameter. In addition, the ECHO command message has a payload of indeterminate length and content, except that the message cannot be longer than the maximum allowed length. The signal processor will send an identical copy of this message back to the Host as a response.

2b. Session Control Catalog

An exemplary listing of messages associated with a Session Control catalog is shown in FIG. 28. The Session Control catalog 1300 contains control messages related to establishing, testing and discontinuing sessions. The signal processor can support several sessions simultaneously. The number of sessions that the signal processor can support depends upon the combination of factors such as Coder/Decoder (Codec) types used, echo cancellation tail length, and other factors that affect the computation and memory requirements for the session.

In general, a session is established (commonly referred to as being "setup") using a SESSION_SETUP command message. After a session has been successfully setup, the default parameters for telephony, voice, fax or modem services may be changed via the appropriate Service Catalog messages described below. Finally, the session is activated by a SESSION_START command message. This commences the streaming of data during the session.

Once a session is started, it can be stopped via a SESSION_STOP command message, then reconfigured using another SESSION_SETUP command message and Service Catalog message and finally restarted using SESSION_START command message. This cycle can repeated for the duration of the call, until finally the session is terminated (commonly referred to as "torn down") via SESSION_STOP and subsequent SESSION_TEARDOWN command messages.

Referring now to FIG. 29, an exemplary payload of a session setup (SESSION_SETUP) command message 1305 is shown. Provided by the host, the SESSION_SETUP command message 1305 initiates a session. All information required to fully describe a session is included in this message. The message provides services (Coder, Decoder, Telephony) for the session and addresses for Near-end and Far-end channels. Each end has a Receive (RX) and a transmit (TX) channel. Thus, a session comprises two flows or four endpoints. For clarity, the "Far-end channels" are those communications paths over a network. The "Near-end channels" are those communications paths more local to the VoP subsystem.

As shown, the SESSION_SETUP command message 1305 comprises a Session ID parameter 1306, a Service Setup field 1307, a Telephony field 1308, a Near-end channels field 1309, a Far-end channels field 1310, a Near-end tag parameter 1311 and a Far-end tag parameter 1312.

The Session ID parameter 1306 includes a Session ID, namely data that is supplied by the Host to uniquely identify a session on the signal processor. In one embodiment, the Host creates and maintains Session IDs for all active sessions that it controls and provides the Session ID for all session based control messages. The signal processor may use the Session ID to identify session related data packets and control messages (responses and asynchronous status) that it sends to the Host. The Session ID will be associated with two flows, usually a TDM flow (Rx,Tx) and a Packet flow (Rx,Tx).

The Service Setup field 1307 includes coder and decoder service parameters 1315 and 1316. The coder service parameter 1315 includes information related to the type of encoder function used between the Near-End Receive channel and Far End Transmit channel. The decoder service parameter 1316 includes information related to the type of decoder function used between the Far-End Receive channel and Near-End Transmit channel. The types of encoder and decoder functions are shown in FIG. 30.

Referring back to FIG. 29, the Telephony Service field 1308 includes parameters 1320–1329 that configure telephony characteristics of the VoP subsystem. One characteristic is the specific TDM data format for received and transmitted TDM voice. The specific TDM data format may be chosen by loading a particular value within the TDMType parameter 1320 of FIG. 29. For instance, the TDM data format may be 16-bit Linear PCM (00), 8-bit G.711-Law (01) or 8-bit G.711 A-Law (10).

Another characteristic involves echo cancellation setup, which may be selected by assigning a value corresponding to the echo cancellation setup options into parameter 1321 as shown in FIG. 31. Yet another characteristic is the selection of a specific test mode for the session through programming of the Test Mode parameter 1322 shown in FIG. 32.

Other characteristics involve enabling or disabling various tone detections or generations such as (1) Dual Tone Modulated Frequency "DTMF" detection (DTD), (2) Call Progress "CP", Fax, Modem tone detection (TD), (3) DTMF generation (DTG), and (4) CP, Fax, and Modem Tone generation (TG). For this embodiment, any of these tone detection or generation mechanisms may be enabled by setting its corresponding DTD, TD, DTG and TG parameters 1323–1326, respectively.

The Mute parameter 1327 includes information that specifies whether or not detected tone or DTMF digits should be forwarded as telephony packets. The Voice Activity Detection (VAD) parameter 1328 includes information that specifies whether voice activity detection algorithms should be used. The in-band/out-band (IBOB) parameter 1329 controls whether or not reports of a detected event are sent to the Host as a control message as well as a transmit data packet.

Referring back to FIG. 29, the "Near End" and "Far End" tags parameters 1311 and 1312 are assigned by the Host and are used to identify packet data flows. For data packets transmitted over the host port, a processor core will insert the appropriate tag in the data packet header. Data packets received or transmitted on the Near-End should contain the Near-End Tag 1311; data packets received or transmitted on the Far-End should contain the Far-End Tag 1312.

The Near and Far Receive (RX) and Transmit (TX) addresses 1330–1333 are the requested physical channel addresses in terms of TDM timeslot (Port#, Slot#) or host port channel ID for the given flow. An example of address types is outlined in FIG. 33.

Referring to FIG. 34, an exemplary payload of a response 1335 to the SESSION_SETUP command message 1305 of FIG. 29 is illustrated. The response, referred to as a SESSION_SETUP_RSP message 1335, is sent by signal processor for every SESSION_SETUP command 1305 received from the Host. Herein, the payload comprises a Status parameter 1336, a Session ID parameter 1337, a Near-end Channel field 1338, a Far-end Channel field 1339 and Session Load parameter 1340.

The Status parameter 1336 includes information to indicate whether or not the SESSION_SETUP command message 1305 of FIG. 29 has successfully completed. The Session ID parameter 1337 includes the Session ID that was provided by the Host. The Session Load parameter 1340 includes the total session load for all sessions which have been setup (MIPs*100).

Both the Near-end and Far-end Channel fields 1338 and 1339 include parameters that specify the Receive (RX) and Transmit (TX) addresses 1341–1344. These addresses 1341–1344 are the actual physical channel addresses in terms of TDM timeslot (Port#, Slot#) or Host Packet Channel ID for the given flow, provided the Status parameter 1336 indicates successful completion of the SESSION_SETUP command message 1305. Otherwise, the parameters are invalid.

When the Host provides the RX and TX addresses 1330–1333 (see FIG. 29) and they are acceptable to the signal processor, they are reflected back using this message. When the Host provides partial addresses, they are assigned by the signal processor and returned to the Host through these parameters 1341–1344.

Referring now to FIG. 35, an exemplary payload of a session start (SESSION_START) command message 1345 is illustrated. Transmitted by the Host to the signal processor, the SESSION_START command message 1345 is used to activate the session. The SESSION_START command message 1345 includes a Session ID 1346 to identify that session. Upon receiving this command, the signal processor controls the input and output of data flows and begins servicing the RX and TX queues.

Referring now to FIG. 36, an exemplary payload of a response 1350 to the SESSION_START command message 1345 of FIG. 35 is illustrated. The response, referred to herein as the SESSION_START_RSP message 1350, is provided by the signal processor in response to every SESSION_START command message 1345 received by the Host. As shown, the SESSION_START_RSP message 1350 comprises a Status parameter 1351 and a Session ID parameter 1352. For this embodiment, the Status parameter 1351 includes information that indicates completion of the SESSION_START command message 1345. For example, codes may be used to indicate success (e.g. "0") as well as particular types of errors. The Session ID parameter 1352 contains the Session ID provided by the Host.

Referring to FIG. 37, an exemplary payload of a session stop (SESSION_STOP) command message 1355 is shown. Provided by the Host to the signal processor, the SESSION_STOP command message 1355 is used to stop or pause the session. The Session ID 1356 is provided to identify the session. Upon receiving this command, the signal processor may temporarily halt the flows of information and pause the session, which may be restarted or torn down.

Referring now to FIG. 38, an exemplary payload of a response 1360 to the SESSION_STOP message of FIG. 37 is illustrated. The response, referred to herein as the SESSION_STOP_RSP message 1360, is provided by the signal processor in response to every SESSION_STOP command message 1355 received by the Host. The SESSION_STOP_RSP message 1360 comprises a Status parameter 1361, which includes information that indicates successful completion of the SESSION_STOP command message 1355. The SESSION_STOP_RSP message 1360 further comprises a Session ID 1362 that was provided by the Host to identify the session.

Referring now to FIG. 39, an exemplary payload of a session teardown (SESSION_TEARDOWN) command message 1365 is illustrated. The SESSION_TEARDOWN command message 1365 is provided by the Host to the signal processor in order to discontinue (i.e., tear down) the session. The Host provides the Session ID 1366 for the session. Upon receiving the SESSION_TEARDOWN command message 1365, the signal processor terminates the session by discontinuing the flow of information in accordance with that session and deallocating memory resources.

Referring now to FIG. 40, an exemplary payload of a response 1375 to the SESSION_TEARDOWN message 1365 of FIG. 39 is illustrated. The response, referred to herein as the SESSION_TEARDOWN_RSP message 1375, is provided by the signal processor in response to every SESSION_TEARDOWN command message 1365 received by the Host. The SESSION_TEARDOWN_RSP message 1370 comprises a Status parameter 1371 including information that indicates successful completion of the SESSION_TEARDOWN command message 1365 and a Session ID 1372 that was provided by the Host to identify the session.

Referring to FIG. 41, an exemplary payload of a session query (SESSION_QUERY) command message 1375 is shown. Transmitted from the Host, the SESSION_QUERY command message 1375 queries the signal processor for information concerning the state of the session identified by the Session ID 1376 contained therein. Upon receiving the SESSION_QUERY command message 1375, the signal processor provides session information to the Host if the session is found.

Referring now to FIG. 42, an exemplary payload of a response 1380 to the SESSION_QUERY message of FIG. 41 is illustrated. The response, referred to as a SESSION_QUERY_RSP message 1380, includes a snapshot of session information on the signal processor to the Host if the session is located. The contents of the SESSION_QUERY_RSP message 1380 include a Status parameter 1381, which includes information that indicates successful completion of the SESSION_QUERY command message 1375. Also, various information provided by the SESSION_SETUP command message 1305 of FIG. 29 for that session is contained in the SESSION_QUERY_RSP message 1380, as shown.

Referring to FIGS. 43A and 43B, an exemplary payload of a session statistics request (SESSION_STATS_REQUEST) command message 1385 is illustrated. Received by the signal processor, the SESSION_STATS_REQUEST command message 1385 requests statistics for a specified session identified by the Session ID 1386. In response, the signal processor transmits a SESSION_STATS_REQUEST_RSP 1390 message, which returns that Session ID 1391, for which the report is directed, a Status parameter 1392 (including information that indicates successful completion of the SESSION_STATS_REQUEST message 1385), as well as various statistics 1393 related to the particular session. These statistics include (1) a Frame Count parameter 1394 specifying the number of frames processed for the session; (2) Bad Frame Count parameter 1395 including information specifying the number of times processing of a frame was ready but not frame was available for the session; and (3) RX/TX overflow and underflow parameters 1396–1399 to indicate overflow and underflow conditions for this session.

2c. Telephony Services Catalog

An exemplary listing of messages associated with a Telephony Services catalog is illustrated in FIG. 44. In general, as shown, the Telephony Services catalog 1400 features control messages such as command, response and status messages supported by the telephony functions of the signal processor. These functions include DTMF detection and generation, tone detection and generation and echo cancellation.

The messages associated with the Telephony Services catalog 1400 operate on an established session, except for the SET_TONE_YYY and REQ_TONE_YYY messages, which affect all sessions. The nomenclature "_YYY" is used to represent any "Set Tone" or "Request Tone" operations. Each of the Telephony messages is configured to contain a valid Session ID to identify the session to be controlled.

It is contemplated that telephony setup commands are supported by telephony default values, so sending "Set-Tone" messages is not required if the telephony default values are acceptable for that session. However, in order to alter these default values, the Session ID is set to a prescribed value (e.g., 0xFFFF). Otherwise, the command is applied to the respective session.

Referring to FIG. 45, an exemplary payload featuring echo cancellation (EC) parameters set forth in a set echo cancellation parameters (SET_EC_PARMS) command message 1405 is illustrated. The EC parameters 1406 defined in this SET_EC_PARMS command message 1405 have global default values. This message can be used to modify the default values on a per session basis. The SET_EC_PARMS command message 1405 can be sent anytime after a session has been setup. If the session has already been started, any parameter modifications will take affect when the next frame is processed.

By setting the Session ID parameter 1407 to a predefined value (e.g., 0xFFFF), this enables the telephony default values to be modified to the values specified in the SET_EC_PARMS command message 1405. It is contemplated, however, that some EC parameters may not be modified without stopping the session and sending a new session setup message (e.g., EC tail length and a frame size).

As shown in FIG. 45, the SET_EC_PARMS command message 1405 comprises a plurality of echo cancellation parameters 1406 including, but not limited or restricted to one or more of the following: an echo cancellation enable (EC) parameter 1410, a non-linear processor enable (NLP) parameter 1411, a comfort noise enable (CNG) parameter 1412, and an echo return loss (ERL) parameter 1413. The EC, NLP and CNG parameters 1410–1412 are set or remain cleared to allow for the enablement or disablement of echo cancellation, non-linear processing and comfort noise, respectively. The ERL parameter 1413 includes information for adjustment of the echo return loss. For example, placement of a logical value of "00" into the ERL parameter 1413 sets the echo return loss approximately equal to 0 decibels (dB). Similarly, logical values of "01" and "10" may adjust the echo return loss to be −3 dB and 6 dB and −6 dB, respectively.

Referring now to FIG. 46, an exemplary payload of a response 1415 to the SET_EC_PARMS command message of FIG. 45 is illustrated. The response, referred to as the SET_EC_PARMS_RSP message 1415, is provided by the signal processor in response to every SET_EC_PARMS command message 1405 transmitted by the Host. The SET_EC_PARMS_RSP message 1415 comprises a Status parameter 1416, which includes information that indicates successful completion of the SET_EC_PARMS command message 1405. The SET_EC_PARMS_RSP message 1415 further comprises a Session ID 1417 that was provided by the Host to identify the session.

The Telephony Services catalog 1400 allows for EC parameters currently used by the signal processor to be requested by transmission of a Request EC Parameters (REQ_EC_PARMS) command message 1420 as illustrated in FIG. 47. The REQ_EC_PARMS command message 1420 includes the Session ID 1421 to identify the session. In response, as shown in FIG. 48, the EC parameters 1406 identified in the SET_EC_PARMS command message 1405 along with the Session ID 1421 are returned to the Host via a response (REQ_EC_PARMS_RSP) message 1425. The REQ_EC_PARMS_RSP message 1425 further comprises a Status parameter 1426 that, when set to a predetermined value, indicates successful completion of REQ_EC_PARMS command message 1420.

Referring to FIG. 49, an exemplary payload of an echo cancellation statistic request (EC_STAT_REQ) command message 1430 is illustrated. The payload includes a Session ID 1431. In response, the signal processor returns a echo cancellation statistic request response (EC_STAT_REQ_RSP) message 1435 to the Host processor as set forth in FIG. 50.

As shown in FIG. 50, the parameters in the EC_STAT_REQ_RSP message 1435 indicate the detailed status of the echo cancellation function for the session. These parameters are used by those familiar with echo canceller operation to evaluate the state and performance of the echo canceller during a connection. For example, the EC_OFF parameter 1436 indicates whether the Echo canceller is currently disabled. The LMS_Init parameter 1437 indicates that the echo canceller coefficients and filter history buffers are being cleared prior to processing a frame. The LMS_Up parameter 1438 indicates that echo canceller filter coefficient updates are enabled. RinDet and SinDet parameters 1439 and 1440 indicate that the Rin or Sin signals have been detected. The DTDet parameter 1441 indicates that the double talk state has been detected. The DTRms and DTDS parameters 1442 and 1443 provide more information on the double-talk condition. NLPST parameter 1444 indicates that the echo canceller is in the non-linear processing state. The FE_Prev parameter 1445 indicates that the far-end talker was active in the previous state. The RIN parameter 1446 indicates that the far-end frame has been detected by the echo canceller. The RESU parameter 1447 indicates whether the echo canceller residual input is below a specified threshold. Tailx0, Tailx1, and Tailx2 parameters 1448–1450 are used to indicate the maximum echo length which the echo canceller should look for. Rin Status parameters 1451, namely RinAve Max Energy, Rin Ave Energy, Rin Energy Peak Decay, and Rin Hang Over provide history information on the Rin signal. Sin Status parameters 1452 provide the same signal history information for the Sin signal. The Sout status parameters 1453, namely, Sout Ave Max Energy and Sout Ave Energy, provide energy history information for the echo canceller Sout signal. The Double Talk Hang Over parameter 1454 indicates the time since the double talk state was detected.

Referring now to FIG. 51, an exemplary payload of a Set DTMF Parameters (SET_DTMF_PARMS) command message 1460 is illustrated. Transmitted from the Host, the SET_DTMF_PARMS command message 1460 comprises a number of parameters including a Session ID 1461, Pulse Time (in intervals of 5 milliseconds "ms") 1462, Guard Time (in intervals of 5 ms) 1463, inter-digit time (in intervals of 5 ms) 1464 and volume 1465. The Pulse Time parameter 1462 includes information that specifies the ON-time for each DMTF pulse. For this embodiment, the time ranges from 5 ms up to 1.25 seconds. The Guard time parameter 1463 specifies the duration of silence time preceding the first DTMF digit and following the last digit. The inter-digit time parameter 1464 includes information that specifies the amount of time between digits in a digit string. The volume parameter 1465 includes information for adjusting the degree of audio produced by activation of a DTMF pulse. For this embodiment, the range is from 0 to −63 dBm0.

Referring to FIG. 52, an exemplary payload of a response 1470 to the SET_DTMF_PARMS command message 1460 of FIG. 51 is illustrated. Returned to the Host, this response, referred to as a SET_DTMF_PARMS_RSP message 1470, includes a Status parameter 1471 including information that indicates successful completion of the SET_DTMF_PARMS command message 1330. Also, the Session ID 1472 associated with the session is a parameter of the SET-DTMF_PARMS_RSP message 1470.

The Telephony Services catalog 1400 allows for DTMF parameters currently used by the signal processor to be requested by transmission of a REQ_DTMF_PARMS command message 1475 as illustrated in FIG. 53. The REQ_DTMF_PARMS command message 1475 includes a Session ID 1476 to identify the session for which the DTMF parameters are requested. In response, as shown in FIG. 54, the DTMF parameters identified in the SET_DTMF_PARMS command message 1460 of FIG. 52 along with the Session ID 1481 and Status parameter 1482 are returned to the Host via a response message (REQ_DTMF_PARMS_RSP) 1480.

Referring not to FIG. 55, an exemplary payload of a Generate DTMF Digits (GEN_DTMF_DIGITS) command message 1485 is illustrated. Besides the Session ID 1486, the GEN_DTMF_DIGITS command message 1485 signals generation of a string of DTMF digits (e.g., 1 or more DTMF digits) by the signal processor. The length of the DTMF digit string is provided by a digit string length parameter 1487. The identifier (ID) of each DTMF digit within the string is provided by digit ID parameters 1488. When set, the Notify bit 1489 of the GEN_DTMF_DIGITS command message 1485 is used to request that an acknowledgment control message be sent after the DTMF digit string generation has completed. The payload of the acknowledgment control message 1490 is set forth in FIG. 56.

Referring now to FIG. 57, an exemplary payload of a response 1495 to the GEN_DTMF_DIGITS command message 1485 of FIG. 55 is illustrated. The response, referred to as a GEN_DTMF_DIGITS_RSP message 1495, is provided by the signal processor in response to every GEN_DTMF_DIGITS command message 1485 transmitted by the Host. The GEN_DTMF_DIGITS_RSP message 1495 comprises a Status parameter 1496 including information that indicates successful completion of the GEN_DTMF_DIGITS command message 1485 and a Session ID 1497 that was provided by the Host to identify the session.

Referring now to FIG. 58, an exemplary payload of a DTMF Report (DTMF_REPORT) command message 1500 is illustrated. The DTMF_REPORT command message 1500 is sent whenever DTMF detection is enabled and a DTMF digit is present. The DTMF_REPORT command message 1500 is sent once at the beginning of the digit detection and again when the digit detection has ended.

As shown, the payload comprises a Session ID 1501, an End parameter 1502, a Digit ID parameter 1503 and a DTMF duration parameter 1504. The End parameter 1502 is set ("1") when the message is associated with the frame in which the DTMF digit has ended. Otherwise, the END parameter bit is cleared ("0"). The Digit ID parameter 1503 features a value of the DTMF digit detected. Each DTMF digit is previously assigned a unique predetermined bit value. The DTMF duration parameter 1504 includes information that indicates the cumulative time that the DTMF digit has been present. When the END parameter is set to "1", this parameter now indicates the total ON-time of the DTMF digit.

Herein, certain parameters are available to support programmable tone generation and detection. For this embodiment, the user can select up to 15 frequencies from a set of 37 to be used in tone generation and detection. Using these 15 selected frequencies, up to 16 different tones can be generated or detected. Each tone defined can consist of a single frequency or multiple frequencies. The ON-time, OFF-time, upper frequency, lower frequency as well as the high and low threshold values can be specified separately for each tone defined.

Referring now to FIG. 59, an exemplary payload of a set tone frequency (SET_TONE_FREQ) command message 1510 is shown. The SET_TONE_FREQ command message 1510 comprises one or more of the following parameters: frequency indices 1511, a first frequency index dictionary 1512, a second frequency index dictionary 1513, a minimum threshold 1514 and a twist 1515. The frequency indices 1361 are an index of frequencies ranging from 350 Hertz (Hz) to approximately 4000 Hz for example.

Herein, the user is allowed to specify 15 frequencies to detect. The first frequency index dictionary parameter 1512 includes, an index (0–14) of the lower frequency component of a tone. The index is selected from one of the 15 frequency indices. The second frequency index dictionary parameter 1513 includes is an index (0–14) of the higher frequency component of the tone. The index is selected from one of the 15 frequency indices. No frequency1 or freqence2 components may be represented by a prescribed code value.

The minimum threshold parameter 1514 includes information that is used to establish a threshold where only signals with energy above this threshold are processed for detection. Recommended threshold value is −45 dBm, but actual value depends on source of the signal.

The twist parameter 1515 includes information that indicates a maximum acceptable ratio between energies of the components of the tone pair signal. The recommended value is 10 dBm, but actual value depends on the signal source.

Referring to FIG. 60, an exemplary embodiment of a payload of a set ON-time for tone cadence (SET_TONE_CADENCE_ON) command message 1520 is shown. The SET_TONE_CADENCE_ON command message 1520 sets the ON-time duration for each tone being generated. Similarly, as shown in FIG. 61, a SET_TONE_CADENCE_OFF command message 1525 sets the OFF-time duration for each tone being generated.

Referring now to FIG. 62, an exemplary payload of a set tone threshold low (SET_TONE_THRESH_LOW) command message 1530 is shown. For each tone capable of being generated, a single frequency component of the tone with energy below this threshold is rejected. The recommended value is −35 dBm, but actual value depends on the source as well as link attenuation. Similarly, as shown in FIG. 63, a set tone threshold hi (SET_TONE_THRESH_HI) command message 1535 causes a single frequency component of the tone with energy above this threshold is rejected. The recommended value is 0 dBm, but actual value depends on the source as well as link attenuation.

Referring now to FIG. 64, an exemplary payload of a response 1540 used in responding to each of the "SET-TONE" command messages of FIGS. 59–63 is illustrated. When provided by the signal processor to the Host, each response comprises a status parameter 1541, which includes information that indicates successful completion of that corresponding "Set Tone" command message.

The current settings for the Tone parameters may be obtained by sending the appropriate REQ_TONE_FREQ, REQ_TONE_CADENCE_ON, REQ_TONE_CADENCE_OFF, REQ_TONE_THRESH_LOW, REQ_TONE_THRESH_HI command message (generically referred to as "REQ_TONE_YYY command messages"). The REQ_TONE_YYY command message features the control header (no payload) configured with the Catalog parameter of the control header specifying "Telephony Services" and the Code parameter to indicate that particular "Request Tone" message.

In response to the REQ_TONE_YYY command message, a response, generically referred to as a "REQ_TONE_YYY_RSP" message is return by the signal processor to the Host. For instance, as shown in FIG. 65, the REQ_TONE_FREQ_RSP command 1545 features a payload that includes a 4-byte Status parameter 1546 preceding information as provided by the SET_TONE_FREQ message of FIG. 59.

Referring to FIG. 66, an exemplary payload of a Tone Generate (GEN_TONE) command message 1550 is illustrated. The GEN_TONE command message 1550 comprises a Session ID parameter 1551 to identify the particular session as well as a Tone ID parameter 1552, a volume parameter 1553 and a tone duration parameter 1554.

The Tone ID parameter 1552 includes information that identifies the type of tone to be generated (e.g., DTMF, etc.). The volume parameter 1553 includes information to specify the audio volume of the tone from 0 dBm0 up to −63 dBm0 for example. The tone duration parameter 1554 includes information that specifies the duration of the tone (e.g., "0" being continuous and the duration equivalent to the binary representation multiplied by 15 ms (such that "000A" is equivalent to a 150 ms tone duration).

Referring now to FIG. 67, an exemplary payload of a response 1555 to the GEN_TONE command message 1550 of FIG. 66 is illustrated. The response, referred to as a GEN_TONE_RSP message 1555, is provided by the signal processor in response to every GEN_TONE command message 1550 transmitted by the Host. The GEN_TONE_RSP message 1555 comprises a Status parameter 1556 including information that indicates successful completion of the GEN_TONE command message 1550. The GEN_TONE_RSP message 1555 also comprises a Session ID 1557 that was provided by the Host to identify the session and the tone ID parameter 1652 identifies the tone type.

Referring to FIG. 68, an exemplary payload of a Stop Tone (STOP_TONE) command message 1560 is shown.

Provided by the Host to the signal processor, the STOP_TONE command message 1560 is used to stop or pause the tone generation. The Session ID 1561 is provided to identify the session. The tone ID 1562 identifies the ID of the tone to stop.

Referring now to FIG. 69, an exemplary payload of a response 1565 to the STOP_TONE command message 1560 of FIG. 68 is illustrated. The response, referred to herein as the STOP_TONE_RSP message 1565, is provided by the signal processor in response to every STOP_TONE command message 1560 received by the Host. The STOP_TONE_RSP message 1565 comprises a Status parameter 1566 including information that indicates successful completion of the STOP_TONE command message 1560. The STOP_TONE_RSP message 1565 further comprises a Session ID 1567 that was provided by the Host to identify the session.

Referring to FIG. 70, an exemplary payload of a Tone Report (TONE_REPORT) command message 1570 is shown. When the Tone Detection enable parameter 1324 of the SESSION_SETUP command message (see FIG. 29) is set and a user programmed tone is detected, tones are reported when they meet the specified ON and OFF times set in the tone parameter configuration messages (e.g., SET_TONE-CADENCE_ON 1520 and SET_TONE-CADENCE_OFF 1525).

The TONE_REPORT command message 1570 comprises a session ID parameter 1571 to identify the particular session as well as a Tone ID parameter 1572, and a tone duration parameter 1573. The Tone ID parameter 1572 includes information related to the type of tone detected while the tone duration parameter 1573 includes information that specifies the total ON-time duration of the tone (according to 15 ms intervals).

Referring to FIG. 71, an exemplary payload of a Fax Tone Report (FAX_TONE_REPORT) command message 1575 is shown. When a fax tone is detected, the FAX_TONE_REPORT command message 1575 is sent to indicate the tone detected. This message will be sent for detection of CNG, CED, or V.21 Fax Tones upon setting of parameters 1576, 1577 and 1578, respectively.

2d. Voice Services Catalog

Referring now to FIG. 72, an exemplary listing of messages associated with a Voice Services catalog 1600 is shown. Herein, the Voice Services catalog 1600 contains messages supported by various voice functions of the signal processor. All messages in this Voice Services catalog 1600 operate on an established session. Hence, a Session ID is required for all these messages. All "SETup" related commands support voice default values, so sending these messages is not required if voice default values are acceptable for a session. To set the default values, the Session ID parameter is set to 0xFFFF (−1). Otherwise, the command is applied to the respective session.

As shown in FIG. 73, an exemplary payload of a SET_VOICE_PARMS command message 1605 is shown. The SET_VOICE-PARMS command message 1605 comprises a Session ID 1606 along with a plurality of voice parameters 1607. These parameters 1607 include, but are not limited or restricted to one or more of the following: a post filter enable (PFE) parameter 1610, a high-pass filter enable (HPFE) parameter 1611, a silent compression enable (SCE) parameter 1612, an encoder rate (ER) parameter 1613, a Reset Encoder (ERES) parameter 1614, a Reset Decoder (DRES) parameter 1615 and an Automatic Level Control (ALC) parameter 1616.

The PFE and HPFE parameters 1610 and 1611 include information for enabling or disabling post filters and high-pass filters, respectively. The ER and ERES parameters 1613 and 1614 include information for modifying encoder rates and resetting the encoder for the next processed frame, respectively. The DRES parameter 1615 includes information that resets the decoder for the next processed frame. The ALC parameter 1616 includes information for automatic adjustment of audio levels according to predetermined decibel increments (e.g., −5 dB intervals).

Referring now to FIG. 74, an exemplary payload of a response to the SET_VOICE_PARMS command message 1605 of FIG. 73 is illustrated. The response, referred to as the SET_VOICE_PARMS_RSP message 1620, is provided by the signal processor in response to every SET_VOICE_PARMS command message transmitted by the Host. The SET_VOICE_PARMS_RSP message 1620 comprises a Status parameter 1621 including information that indicates successful completion of the SET_VOICE_PARMS command message 1605 and a Session ID 1622 that was provided by the Host to identify the session.

The Voice Services catalog 1600 allows for voice parameters currently used by the signal processor to be requested by transmission of a REQ_VOICE_PARMS command message 1625 as illustrated in FIG. 75. An exemplary payload of the REQ_VOICE_PARMS command message 1625 includes the Session ID 1626 to identify the session. In response, as shown in FIG. 76, the Voice parameters 1631, equivalent to those provided by the SET_VOICE_PARMS command message 1605 of FIG. 73 along with the Session ID 1632 and a Status parameter 1633 are returned to the Host via a payload of a response message (REQ_VOICE_PARMS_RSP) 1630.

2e. Fax Services Catalog

Referring now to FIG. 77, an exemplary listing of messages associated with a Fax Services catalog 1700 is illustrated. Herein, the Fax Services catalog 1700 contains messages supported by various facsimile functions of the signal processor. All messages in this Fax Services catalog 1700 operate on an established session. Hence, a Session ID is needed for all of these messages. All "SETup" related commands support facsimile default values, so sending these messages is not required if default values are acceptable for a session. To set the default values, the Session ID parameter may be set to be 0xFFFF (−1). Otherwise, the command is applied to the respective session.

As shown in FIG. 78, an exemplary payload of a SET_FAX_PARMS command message 1705 comprises a Session ID 1706 and a plurality of fax parameters 1707, including, but not limited or restricted to one or more of the following: a maximum Modem Speed parameter 1710, a system delay parameter 1711, and a debug parameter 1712. The maximum Modem Speed parameter 1710 indicates a highest modem data rate that should be supported by the fax relay gateway. The system delay parameter 1711 indicates the number of frames of incoming data to ignore after any remodulated data transmission. This is a logical form of echo cancellation that is necessary because the echo canceller is turned off during fax transmission. Normally, a default is set to approximately five (30 ms) frames. The debug parameter 1712 indicates whether debug information should be included in the fax packets. Normally, as a default, the debug information is excluded.

Referring now to FIG. 79, an exemplary payload of a response 1715 to the SET_FAX_PARMS command message 1705 of FIG. 78 is illustrated. The response, referred to as the SET_FAX_PARMS_RSP message 1715, is provided by the signal processor in response to every SET_FAX_PARMS command message 1705 transmitted by the Host. The SET_FAX_PARMS_RSP message 1715 comprises a Status parameter 1716 including information that indicates the successful completion of the SET_FAX_PARMS command message 1705 and a Session ID 1717 that was provided by the Host to identify the session.

The Fax Services catalog 1700 allows for fax parameters currently used by the signal processor to be requested by transmission of a REQ_FAX_PARMS command message 1720 as illustrated in FIG. 80. The REQ_FAX_PARMS command message 1720 includes a Session ID 1721 to identify the session. In response, as shown in FIG. 81, the Fax parameters 1726 (equivalent to the parameters provided by the SET_FAX_PARMS command message 1705 of FIG. 78) along with the Session ID 1727 and Status parameter 1728 are returned to the Host via a payload of a response message (REQ_FAX_PARMS_RSP) 1725.

Additionally, as shown in FIG. 82, an exemplary payload of a report fax disconnect (REPORT_FAX_DISCONNECT) command message 1730 is illustrated. The REPORT_FAX_DISCONNECT command message 1730 is an autonomous message, which is generated by the signal processor when it detects the fax disconnect state during a Fax session. The payload simply includes a Session ID 1731 associated with the Fax session.

2f. Modem Services Catalog

FIG. 83 is an exemplary listing of messages associated with a Modem Services catalog 1750 is illustrated. Herein, the Modem Services catalog 1750 contains messages that are used to set modem parameters utilized by the signal processor such as equipment type, data transfer rates, imaging characteristics and the like. Similar to the Telephony, Voice and Fax services, all messages in this Modem Services catalog 1750 operate on an established session. Hence, a Session ID is required for all these messages. All "SETup" related commands support modem default values, so sending these messages is not required if the modem default values are acceptable for a session. To set the default values, the Session ID parameter may be set to 0xFFFF (−1). Otherwise, the command is applied to the respective session.

C. Illustrative Example of Initialization Phase

Figure 84:
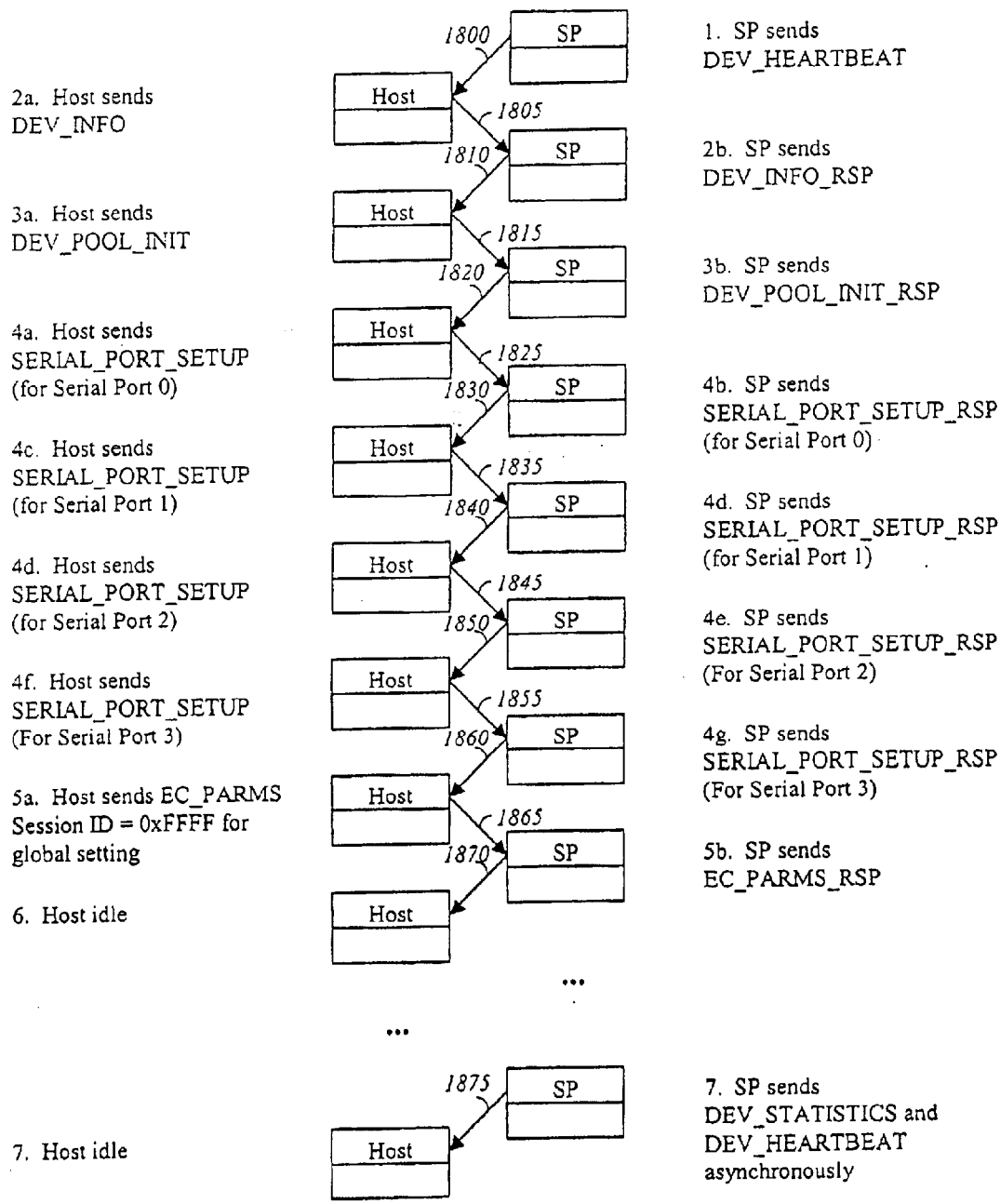
FIG. 84 is an exemplary embodiment of a sequence of control messages used by the Host and the signal processor during the Initialization phase.

Referring now to FIG. 84, an exemplary embodiment of a sequence of control messages used by the Host and the signal processor during the Initialization phase is shown. These control messages are used to alter operational parameters of the signal processor. The parameters are then used as default settings for the individual sessions.

For this embodiment, upon successful completion of the Initialization process, the signal processor sends a DEV_HEARTBEAT message (see FIG. 21) to the Host (see block 1800). The DEV_HEARTBEAT message indicates to the Host that the signal processor is active. Upon receiving the DEV_HEARTBEAT message, the Host sends a DEV_INFO message to the signal processor in order to obtain information pertaining to the signal processor (block 1805). In response, the signal processor returns a DEV_INFO_RSP message (see FIG. 16) to the Host (block 1810). The contents of the DEV_INFO_RSP message provide the Host the current state of the signal processor's hardware and firmware versions and other base-level information needed to determine if its contents are up-to-date.

Next, as an optional feature, the Host sends a DEV_POOL_INIT message (see FIG. 17) to the signal processor. In response, the signal processor sends a DEV_POOL_INIT_RSP message (see FIG. 18), which is used to configure the internal configuration of memory among various buffer pools (see blocks 1815 and 1820).

The next operation involves the initialization and set up of the serial ports. For this embodiment, four interactive messages, namely SERIAL_PORT_SETUP (see FIG. 23) and SERIAL_PORT_SETUP_RSP (see FIG. 24) for each serial port as shown in blocks, 1825, 1830, 1835, 1840, 1845, 1850, 1855 and 1860. Thereafter, various options for configuring the firmware become quite varied, depending on the application. One or more messages associated with Device Control, Session Control and a variety of Services catalogs can be transmitted to properly configure the firmware of the signal processor. One of these messages, namely SET_EC_PARMS may be used to set echo cancellation parameters (blocks 1865 and 1870).

Once the configuration interchanges are complete, typically the signal processor becomes idle while awaiting commands from the HOST to set up and handle sessions. During this idle time, the signal processor asynchronously sends DEV_STATISTICS and DEV_HEARTBEAT messages (block 1875) to the Host, depending on how the parameters of these two messages were configured in the DEV_REPORT_CONFIG message (see FIG. 19).

D. Illustrative Example of Run-time Phase

Referring now to FIG. 85, an exemplary embodiment of a flow diagram of the sequence of control messages exchanged between the Host and signal processor to set up and run a voice connection session is illustrated. Each session is independent of all other sessions in that they are set up, torn down asynchronously of each other. The parameters set with the session-level control messages are in effect for just the session they are addressed and revert to default values once the session is torn down.

As shown in block 1900, the Host starts the setup process by requesting that a session be set up with a SESSION_SETUP message (see FIG. 29). Besides defining the Near-end and Far-end channels, a large number of telephony equipment parameters can be set with this message. However, one important parameter, the Session ID, is supplied by the Host to uniquely identify the session to both the Host and the signal processor. While it is permissible to reuse a Session ID once a previous instantiation of it has been torn down, only one instantiation of a Session ID is permitted at any time.

The signal processor responds with a SESSION_SETUP_RSP message (see FIG. 34), which confirms the acceptance of the Session ID and also returns corrected Near-end and Far-end address parameters if it is able to do so (block 1905). From this time on, the Session ID is a critical parameter in all session-level messaging. If it has not been acknowledged with a status code value indicating successful completion of the SESSION_SETUP message, there is no session.

Assuming successful completion of the SESSION_SETUP message, the session is now set up, but not active. Other command messages from both the Telephony and Voice Services catalogs can be used to further modify the session-level parameters. As an illustrative example, the SET_VOICE_PARMS and SET_VOICE_PARMS_RSP message exchange is shown (blocks 1910 and 1915).

The next operation is to start the session. As shown in blocks 1920 and 1925, this may be accomplished by the Host initiating a SESSION_START message (see FIG. 35) to the signal processor and the signal processor returning a SESSION_START_RSP message (see FIG. 36). If the Status parameter of the SESSION_START_RSP message indicates that the SESSION_START message has successfully completed, the Host can start sending data through data messages described below. Typically, this process is two-way as most connections have two channels, one in each direction. For one channel, the Host sends data messages to the signal processor. For the other channel, the signal processor sends packet data to the Host.

The loading and unloading of data from internal memory within the signal processor involves analysis of Host Port DMA registers. For instance, the Host checks the HPRQSTAT_x register before writing data into the RX data queue and the signal processor reads data packets from the RX data queue and after processing, posts data packets to the TX data queue (blocks 1930 and 1935). Similarly, the Host checks the HPXQSTAT_x registers for these channel before accepting packeted data to be read from the TX data queue of the signal processor (blocks 1940 and 1945).

As shown in block 1950, this data transfer process can continue as long as necessary and can be paused using the SESSION_STOP message (see FIG. 37). This message does not destroy the session, but rather makes the session inactive on a frame boundary.

If for some reason it is desirable to change one of the run-time parameters, the change can be made by first stopping the session using the SESSION_STOP message (See FIG. 37) or one of the Telephony Services or Voice Services messages in session mode (for example, with the Session ID in place of 0xFFFF). After that, the SESSION_START message is used to restart the session.

E. Data Messages

During run-time phase, the signal processor will have several sessions active at any time. These sessions will need TDM and packet data frames as input and will generate TDM and packet data frames as output. The data interface specifies message formats that allow transport of the packet data frames over the Host Interface. The TDM data is transported over the serial port interface.

As previously mentioned, for this embodiment, the signal processor features a total of 512 RX queues and 4 TX queues backed by DMA. These queues are configured in this example to support up to 509 individual RX packet data flows into the signal processor and up to 2 global TX packet data flows out of the signal processor.

Referring now to FIG. 86, an exemplary embodiment of a data message is shown. The data message 2000 includes a data header 2005 and a payload 2025. Illustrated as an 8-byte header for this embodiment, the data header 2005 includes flow termination tag parameter 2010, payload related parameters 2015 and a time-stamp parameter 2020.

The flow/termination tag parameter 2010, assigned by the Host in the SESSION_SETUP command message (see FIG. 29), identifies the endpoint associated with this data frame. Thus, data packets associated with the Near-end Transmit queue will have the Near-end Tag while packets associated with the Far-end Transmit queue will have the Far-end Tag.

The payload related parameters 2015 include a payload buffer length 2016, a marker 2017 and a payload type 2018. The payload buffer length parameter 2016 includes information that specifies the size of the payload buffer in bytes (not including the 8-byte header). For this embodiment, the payload buffer size should be mod 8 bytes and large enough for the maximum size payload needed for the coder/decoder (e.g., the voice payload). The marker parameter 2017 is a control bit that, when set, indicates the first speech frame after one or more silence frames. The payload type parameter 2018 includes information that defines the format of the data frame payload as defined in FIG. 87 for example.

The time-stamp parameter 2020 includes information that indicates the sampling time of the first byte in the data frame. This parameter 2020 is used as a means of synchronizing and jitter calculations for the Far-end. The time stamp may be in units of 1 ms.

For a data message including PCM data, the payload 2025 features M 16-bit PCM samples (M≧1) as shown in FIG. 88. It is contemplated that pad bytes may be added to the message, if necessary, to make the size modulo four bytes.

For a data message containing encoded voice frames, these frames may be encoded in accordance with G.711 A-law, -law, G.726, G.727, G.723.1 and G729A/B. There are two ways of transferring G.711, G.726 and G.727 payloads across the signal processor. One way is through Generic PCM/ADPCM Transfer (FRF.11 & ITU G.764 Recommendation). For this payload transfer scheme, the voice samples encoded in accordance with G.711 (PCM), G.726 (ADPCM), or G.727 (EADPCM), are inserted into the payload structure 2025 as set forth in FIG. 89.

The voice transfer structure 2025 contains blocks 2030 arranged according to the significance of the bits. A first block 2031 contains the most significant bits (MSBs) of all the encoded samples; the second block 2032 contains the second MSBs and so on. Within a block, the bits are ordered according to their sample number. Since the 5 ms encoding interval corresponds to 40 samples, each block contains 5 bytes.

A particular feature of this structure is that non-critical (enhancement) information is placed in locations where it can easily be discarded, without impacting the critical (core) information. For example, if 32-kbits EADPCM (G.727 (4,2)) is used, then there will be four blocks corresponding to four bits of varying significance (MSB block, MSB-1 block, MSB-2 block, least significant bit "LSB" block). The least significant blocks (MSB-2, LSB) would be associated with enhancements and may be discarded under congestion conditions.

While this invention has been described with reference to illustrative embodiments, this description is not intended to be construed in a limiting sense. Various modifications of the illustrative embodiments, as well as other embodiments of the invention, are deemed to lie within the spirit and scope of the invention.

What is claimed is:

1. A messaging communication scheme comprising:

receiving a first control message by a signal processor, the control message comprises a message header portion and a control header portion, the control header portion includes a catalog parameter indicating a selected grouping of control messages and a code parameter indicating a selected operation of the selected grouping; and responding to the first control message by transmitting a second control message by the signal processor.

2. The messaging communication scheme of claim 1, wherein the signal processor is controlled, configured and monitored by control messages, including the first control message, from a host processor.

3. The messaging communication scheme of claim 1, wherein the catalog parameter is selected to be a Device Control catalog.

4. The messaging communication scheme of claim 3, wherein the first control message is a node setup (DEV_SET_NODE) message for the signal processor to establish a Node Identifier (Node ID) to identify the signal processor and provide the Node ID in the second control message.

5. The messaging communication scheme of claim 3, wherein the first control message is a device information request (DEV_INFO) message for the signal processor to return the second control message with information concerning a version of the signal processor, a version of internal logic within the signal processor and a size of internal memory within the signal processor.

6. The messaging communication scheme of claim 3, wherein the first control message is a device report configuration (DEV_REPORT_CONFIG) message that configures the signal processor to periodically send status messages to a source of the first control message.

7. The messaging communication scheme of claim 3, wherein the first control message is a serial port setup (SERIAL_PORT_SETUP) message that configures a serial port of the signal processor.

8. The messaging communication scheme of claim 1, wherein the catalog parameter is selected to be a Session Control catalog.

9. The messaging communication scheme of claim 8, wherein the first control message is a session setup (SESSION_SETUP) message to establish a communication session, the SESSION_SETUP message including a session identification parameter, a service setup field, a telephony field, a Near-end channels field, a Far-end channels field.

10. The messaging communication scheme of claim 9, wherein the session identification parameter is supplied and maintained by a source of the control message to uniquely identify the communication session.

11. The messaging communication scheme of claim 9, wherein the service setup field includes a coder service parameter to indicate encoder and decoder types.

12. The messaging communication scheme of claim 9, wherein the telephony service field includes parameters that configure telephony characteristics handled by the signal processor.

13. The messaging communication scheme of claim 9, wherein the first control message is a session stop (SESSION_STOP) message to temporarily halt a flow of information and pause the communication session.

14. The messaging communication scheme of claim 9, wherein the first control message is a session teardown (SESSION_TEARDOWN) message to discontinue the communication session.

15. The messaging communication scheme of claim 1, wherein the catalog parameter is selected to be a Telephony Services catalog so that the first and second control messages configure telephony functionality of the signal processor, the telephony functionality includes tone detection and generation including Dual Tone Multi-Frequency (DTMF) tones and echo cancellation.

16. The messaging communication scheme of claim 1, wherein the catalog parameter is selected to be a Voice Services catalog so that the first control message adjusts a selected voice function including modification of encoder rates.

17. The messaging communication scheme of claim 1, wherein the catalog parameter is selected to be a Voice Services catalog so that the first control message adjusts a selected facsimile function including a modem data rate.

18. A software stored in a machine-readable medium executed by a signal processor within a voice over packet (VoP) subsystem device, the software comprising:
a first software module to receive a first control message from an external source, the first control message including a catalog parameter that indicates a selected grouping of control messages and a code parameter that specifies a selected command message associated with the selected grouping; and
a second software module to respond to the first control message by transmitting a second control message.

19. The software of claim 18, wherein the first control message is a session setup (SESSION_SETUP) message to establish a communication session, the SESSION_SETUP message including a session identification parameter, a service setup field, a telephony field, a Near-end channels field, a Far-end channels field.

20. The software of claim 18, wherein the catalog parameter is selected to be a Telephony Services catalog so that the first and second control messages configure telephony functionality of the signal processor, the telephony functionality includes tone detection and generation including Dual Tone Multi-Frequency (DTMF) tones and echo cancellation.

21. The software of claim 18, wherein the catalog parameter is selected to be a Voice Services catalog so that the first control message adjusts a selected voice function including modification of encoder rates.

22. A Voice Over Packet (VoP) subsystem comprising:
a host processor; and
a signal processor in communication with the host processor, the signal processor including
an internal memory,
a control processor,
a direct memory access (DMA) controller coupled to the internal memory and the control processor,
a plurality of serial ports in communication with the control processor, each of the plurality of serial ports being adapted to receive non-packetized voice samples, and
a host port in communication with the control processor, the host port to receive packetized control messages from the host processor, the control messages being used by the host processor to control, configure, monitor and communicate with the signal processor without knowledge of a specific architecture of the signal processor.

23. The VoP subsystem of claim 22, wherein the signal processor to receive a node setup (DEV_SET_NODE) message from the host processor in order to establish a Node Identifier (Node ID) to identify the signal processor, the Node ID is provided by the signal processor to the host processor in a response control message.

24. The VoP subsystem of claim 22, wherein the signal processor to receive a device information request (DEV_INFO) message from the host processor and to return a control message with information concerning a version of the signal processor, a version of internal logic within the signal processor and a size of the internal memory within the signal processor.

25. The VoP subsystem of claim 22, wherein the signal processor to receive a device report configuration (DEV_REPORT_CONFIG) message that configures the signal processor to periodically send status messages to the host processor.

26. The VoP subsystem of claim 22, wherein the signal processor to receive a serial port setup (SERIAL_PORT_SETUP) message from the host processor, the SERIAL_PORT_SETUP message configures a serial port of the signal processor.

27. The VoP subsystem of claim 22, wherein the signal processor to receive a session setup (SESSION_SETUP) message from the host processor to establish a communication session between the host processor and the signal processor, the SESSION_SETUP message including (1) a session identification parameter supplied and maintained by the host processor to uniquely identify the communication session, (2) a service setup field that includes parameters to specify encoder and decoder types, (3) a telephony field, (4) a Near-end channels field, and (5) a Far-end channels field.

* * * * *

UNITED STATES PATENT AND TRADEMARK OFFICE
CERTIFICATE OF CORRECTION

PATENT NO. : 6,928,076 B2
DATED : August 9, 2005
INVENTOR(S) : Mehta et al.

Page 1 of 1

It is certified that error appears in the above-identified patent and that said Letters Patent is hereby corrected as shown below:

Column 23,
Line 2, delete the first occurance of "and 6dB".

Signed and Sealed this

Sixth Day of December, 2005

JON W. DUDAS
*Director of the United States Patent and Trademark Office*